United States Patent
Janek

(10) Patent No.: US 8,403,789 B2
(45) Date of Patent: Mar. 26, 2013

(54) TRANSMISSION

(76) Inventor: Bartolomej Janek, Presov (SK)

(*) Notice: Subject to any disclaimer, the term of this patent is extended or adjusted under 35 U.S.C. 154(b) by 816 days.

(21) Appl. No.: 12/435,272

(22) Filed: May 4, 2009

(65) Prior Publication Data

US 2009/0270215 A1    Oct. 29, 2009

(51) Int. Cl.
*F16H 31/00* (2006.01)
(52) U.S. Cl. ................................................ 475/116
(58) Field of Classification Search .............. 475/162, 475/168, 169, 170, 179, 180
See application file for complete search history.

(56) References Cited

U.S. PATENT DOCUMENTS

| | | | | |
|---|---|---|---|---|
| 4,407,170 A | * | 10/1983 | Fukui | 475/179 |
| 5,429,556 A | * | 7/1995 | Ishida et al. | 475/180 |
| 5,505,668 A | * | 4/1996 | Koriakov-Savoysky et al. | 475/180 |
| 5,655,985 A | * | 8/1997 | Herstek | 475/179 |
| 5,908,372 A | * | 6/1999 | Janek | 477/162 |
| 2006/0199692 A1 | * | 9/2006 | Janek | 475/162 |

* cited by examiner

*Primary Examiner* — David D Le
*Assistant Examiner* — David J Hlavka
(74) *Attorney, Agent, or Firm* — John Alumit

(57) ABSTRACT

Described is a transmission, having a hollow cylindrical base body, which has an internal toothing and a rotational axis, with end sides in which are rotatably mounted a driven input element and an output element, wherein the output element comprises two rotary bodies which can be or are connected to one another in a non-rotatable fashion and which have a circular cross section transversely with respect to the rotational axis and between which are arranged at least one gearwheel and means for converting planetary movements of the gearwheel into rotational movements of the output element. In the transmission, the forces which hold the output element together and the bearing forces which act between the output element and the base body are independent of one another.

24 Claims, 15 Drawing Sheets

A-A

A-A/B-B

TRANSMISSION

CROSS-REFERENCE TO RELATED APPPLICATION

Figure 1:
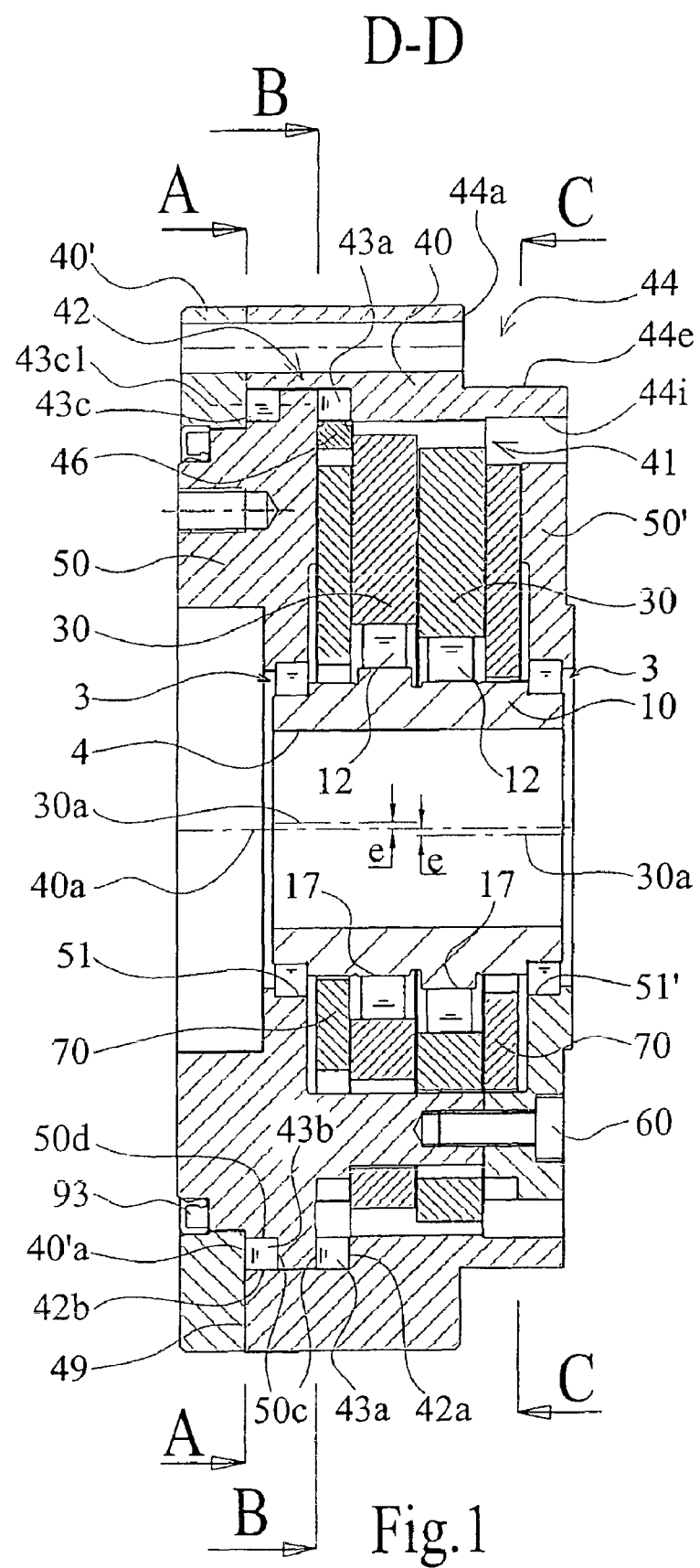

This application claims the benefit of the priority filing date of international application no. PCT/IEP2007/1009250. The earliest priority filing date is Nov. 3, 2006.

FEDERALLY SPONSORED RESEARCH

Not Applicable

SEQUENCE LISTING OR PROGRAM

Not Applicable

STATEMENT REGARDING COPYRIGHTED MATERIAL

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND

The invention relates to a gear in accordance with the preamble of claim 1. A gear with an interior tooth arrangement, as well as having a cup-shaped, base body with a rotary shaft, is claimed as described in PL 169808 B1. A driven input member and an output member are seated, and rotatable, around a rotary shaft in the base body. The output member comprises a rotating body with a cross section which is circular transversely to the rotary shaft. Two toothed wheels meshing with the interior gear wheel, as well as means for converting planetary movements of the toothed wheels into rotary movements of the output member, are arranged between the rotating body and the bottom of the cup-shaped base body. The input member is seated in the rotating body and in the bottom. The rotating body is seated in the base body and on the input member. Disadvantages arise from accessibility at only one end, in particular in view of a driving and a driven member, as well as from the complexity and uncontrollability of mounting in a cup which is closed on one side.

A gear with a base body which has an interior tooth arrangement is known from EP 0 474 897 A1 in which a driven input shaft, as well as an output shaft, are rotatably seated in the base body. An output member is connected, axially displaceable, with the output shaft. The output member includes two rotating bodies, which are arranged at a distance from each other and have a circular cross section. The input and the output shafts are oriented perpendicularly with the two rotating bodies. The rotating bodies are fixedly connectable, or respectively connected, with each other. Two toothed wheels, which mesh with the interior toothed wheel, as well as means for converting planetary movements of the gear wheels into rotary movements, are arranged between the rotating bodies. The output member is supported in a bearing-free manner in the radial direction in respect to the base body by means of the toothed wheels which mesh with the inner tooth arrangement. Support of the output member in the axial direction in regard to the base body does not exist, or is respectively also embodied to be bearing-free, so that axial movements of the output member are only maintained by contact with a cover, the base body, or with the flanks of the inner tooth arrangement. Low efficiency of the gear is disadvantageous here, along with the expected heavy wear on the output member, which is arranged in a bearing-free manner in the base body.

A gear is known from WO 95/22017, which has a base body with front sides, in the shape of a hollow cylinder with an interior tooth arrangement and with a rotating shaft. In the base body, a driven input member and an output member are seated and rotatable around the rotating shaft. The output member includes two rotating bodies, which are arranged at a distance from each other and have a cross section which is circular transversely in regard to the rotating shaft. The rotating shaft is located perpendicularly with respect to the two rotating bodies. The rotating bodies can be, or are, fixedly connected to each other. At least one toothed wheel, which meshes with the interior tooth arrangement, as well as means for changing planetary movements of the toothed wheel into rotating movements of the output member, are arranged between the rotating bodies. The input member is seated on both sides in the rotating bodies of the output member, which is in turn seated with both sides in the hollow cylinder-like base body.

Here, both rotating bodies are seated directly on, or in the base body. In this way, the adjustable force which keeps the two rotating bodies together simultaneously acts on the seating of the two rotating bodies. As a result, twisting of the seating, increased wear, and heating occurs, and in the worst case scenario, the gear is blocked. Moreover, the assembly of the gear is cumbersome because the parts arranged between the rotating bodies must be inserted after the rotating bodies have been arranged in the base body. Furthermore, forces acting on the gear, in particular exterior forces acting in the axial direction, are transmitted to the interior of the gear leading to fluctuating loads and fatigue.

In this case, seating has been designed in such a way that one radial bearing supports one rotating body, respectively, and at one end face of the base body against radial forces acting in a standard way in regard to the rotating shaft. Furthermore, one axial bearing supports respectively one of the two rotating bodies arranged on both sides of the base body, and on one end face of the base body, against axial forces directed toward the base body in the direction of the rotating shaft. The input member is seated in principle in the same way on the rotating bodies. The axial bearings which support the input member in the rotating bodies against axial forces are, however, arranged exactly in the opposite way as the axial bearings for supporting the rotating bodies on the base body. This means that the input member is seated by means of one axial bearing on the two rotating bodies, respectively, which transmits axial forces acting on the input member (in the direction of the rotating shaft) away from the base body to the rotating body respectively arranged in the force direction on the outside of the base body. Combined axis-radial bearings can selectively fulfill both functions simultaneously.

Fundamentally, without a connection between the two rotating bodies, the gear would fall apart. To prevent this, the two rotating bodies of the output member are releasably connected to each other by connecting elements such as screws. Here, the connecting elements simultaneously fulfill several functions. For one, they make sure that the same number of revolutions and the same torques are applied to both power take-off sides constituted by the two rotating bodies, and that they regularly work the sides of the gear. Since the connecting elements connect the rotating bodies to each other, they also keep the parts of the gear located in the base body along the rotating shaft together. Essentially, these parts are one or several toothed wheels which mesh with the interior toothed wheel, the input member itself, and the means for converting planetary movements of the toothed wheel(s) into rotating movements of the output member. Moreover, the connecting elements transmit axial forces acting on the input member and/or the output member to that rotating body whose axial seating is capable of transferring the respective axial forces to the base body again. Such axial forces, or respectively pairs of axial forces, can also be generated, for example, by moments acting on the input and/or output member transversely in respect to the rotating shaft. The connecting elements additionally prevent the bearings arranged between the output member and the input member, as well as between the output member and the base body, from falling out by pressing the rotating bodies on both sides against the front side bearing surfaces of the base body.

If particularly quiet running and high gearing (and transfer quality of the drive output at the drive and power take-off sides) is to be achieved, particular difficulties arise from the multiple functions of the connecting elements. For example, to transmit axial forces and/or pairs of forces acting on the base body via the input and/or output members and the bearings of the rotating bodies, the connecting elements must press the two rotating bodies together with pre-stress because otherwise these forces would pull the rotating bodies apart. If the rotating bodies were pulled apart, a dependable and precise operation of the gear would no longer be assured. The creation of a correspondingly strong pre-stress demands a correspondingly large dimensioning of the connecting elements. However, connecting elements of large dimensions require structural space and increases the weight of such a gear. The bearings between the input member and the rotating bodies, as well as between the rotating bodies and the base body, should not be allowed to strongly press together in the axial direction by the pre-stress. Otherwise the gear will be excessively heated because of frictional losses in the bearings. However, since the tolerance of the parts arranged between the rotating bodies along the rotating shaft, are added to the tolerance of the rotating bodies and the base body, the above requirements are contraindicated.

Because a disadvantageous summing up of the tolerances of the parts arranged between the rotating bodies may occur, the parts can also be pressed together in the event a large pre-stress of the rotating bodies is required. This can lead to large frictional losses between the parts, causing the gear to become overheated and destroyed. In the worst case scenario, these parts can even cease to function. Also since, in the case of a disadvantageous summing up of the tolerances of the rotating bodies and the base body, and/or the rotating bodies and the input member, the axial bearings between the rotating bodies and the base body, and/or the axial bearings between the input member and the two rotating bodies, may be pressed together if a large pre-stress of the rotating bodies is required. This can also lead to large frictional losses in the axial bearings causing the gear to overheat and fail prematurely. Finally, in this regard, it is important to note that the rotating bodies can even sag concavely.

A further disadvantage resulting from the multi-function of the connecting elements is that the pre-stress applied via the connecting elements can slacken during the operation of the gear, particularly since the connecting elements are continuously stressed.

The disadvantages of the prior art can therefore be summed up as follows:
a) the mutual dynamic stress of the rotating bodies,
b) all parts of the output member must be produced with especially high precision and matched to the corresponding parts of the base body, which leads to a long and disadvantageous chain of tolerances,
c) the tilting resistance of the output member is limited by the elasticity of the connecting means (screws) extending in the axial direction,
d) the long startup time of the gear.

The object of the invention is to provide relief here, and in particular to further develop the gear in accordance with the species without unreasonable constructive outlay, and in such a way that increased torsional strength, as well as greater power density, is achieved with the same measurements, but with simpler manufacture of the individual parts and simpler assembly of the gear.

The object is attained by means of the characteristics of claim 1. Accordingly, a gear in accordance with the invention is comprised of a hollow cylinder-like base body having an interior tooth arrangement, as well as a rotating shaft and end faces. A driven input member and output member are rotatably seated in the base body. The output member is comprised of two rotating bodies which can be, or respectively are, connected to each other in a secure manner to avoid twisting. The rotating bodies have a cross section which is circular transversely in respect to the rotating shaft. At least one toothed wheel is arranged between the rotating bodies. The toothed wheel preferably meshes with the interior tooth arrangement. Means for converting planetary movements of the toothed wheel into rotating movements of the output body are arranged between the rotating bodies. The forces which hold the output member of the gear together are independent of the seating forces acting between the output member and the base body.

So that the forces holding the output member together are independent of the seating forces acting between the output member and the base body, it has been preferably provided that the axial forces holding the output member together will be, or respectively are, applied between the rotating bodies of the output member. The axial seating forces acting between the output member and the base body will be, or respectively are, only applied between one of the two rotating bodies of the output member and the base body.

The axial forces keeping the output member together will be, or respectively are, preferably supplied by means acting between the rotating bodies of the output member.

The axial seating forces acting between the output member and the base body will be, or respectively are, supplied with the aid of means for acting only on one of the two rotating bodies of the output member.

It is evident that the invention can be accomplished in any event at the point at which, in a conventional planetary gear, the compact output member is regularly seated with two rotating bodies extending parallel to, and at a distance between each other, in such a way that, of the two rotating bodies, only a single rotating body is directly seated in or on the base body. The two rotating bodies constitute the end faces of the output member and the base body. The exterior forces acting on the output member in the course of operation, at least in the axial direction, are for all practical purposes completely taken up by the rotating body seated directly in or on the base body. The other rotating body located on the other side of the base body is for all practical purposes not subjected to exterior forces and, in particular, is not subjected to exterior forces acting in the axial direction. This rotating body also is not in working contact with the base body. The only important force acting on the rotating body (which is not rotatably seated on or in the base body, or is only indirectly rotatably seated on or in the base body, or is only directly rotatably seated in or on the base body as a support against radial forces), is the static force produced by the connecting means, normally screws, for keeping the output member—which is designed as a unit—together. With this constellation, it can be assured that the working forces acting indirectly or directly, at least in the axial direction on the rotating body seated in or on the base body, are not transferred to the other rotating body. As a result, the only areas of the gear which must be worked at high precision are the contacting and bearing surfaces of the base body, the rotating body seated indirectly in or on the base body, and the holding body, which are provided for seating the output member. Since these surfaces are accessible without problems from one direction of the gear, it is possible to cut the production time of the gear in half. A further advantage of the steps in accordance with the invention is that the active interior space of the gear is noticeably increased by the special positioning of the seating elements, therefore considerably increasing the output of the gear without changing the exterior dimensions, and the weight of the gear is reduced.

In general, the basic idea of the invention can be applied to all types of planetary gears. In accordance with the invention, preferably only one of the rotating bodies is seated directly on the base body, at least with respect to the axial forces, for obtaining the independence of the seating forces and of the forces keeping the rotating bodies together. Furthermore, a ring-like holding body, which can be fixedly connected with one end face, is preferably provided, on which the rotating body, which is directly seated on the base body, is supported via bearing means. The holding body can be preferably embodied as a thick-walled, and easy to work, pipe section, whose two end faces merely need to be grounded and provided with suitable openings for screws, without any problems. The rotating body seated directly on the base body can furthermore be supported on the base body via the same, or other, seating means.

In comparison with the prior art, the gear in accordance with the invention has the advantage of connecting elements, normally screws, that are load-free to the greatest extent because of the one-sided seating, at least in respect to the axial forces, of the output member in the area of only one rotating body. Now, a transfer of force from the seated rotating body to a frame supporting the gear takes place while completely bypassing the second rotating body which is, at least in respect to the axial forces, not seated, and therefore bypassing the connecting elements which connect the two rotating bodies to each other.

Besides a remedy of the disadvantages known to exist in the prior art, the gear in accordance with the invention has the additional advantage of being considerably more easy to produce and assemble. Among other things, this is caused by the seating means for seating the rotating bodies directly in or on the base body, so that for support, at least in regard to the axial forces, they need only be arranged on one side of the base body. Since these seating means are preferably the only connection between the parts arranged between the rotating bodies and the base body, the gear in accordance with the invention can be easily produced in successive steps. Initially, all parts located between the rotating bodies can be mounted and positioned with respect to each other by connecting the two rotating bodies. Subsequently, the entire block consisting of the rotating bodies, and parts arranged between them, can be arranged in the base body. Here, it is no longer necessary, as in the prior art, for the rotating bodies and the parts arranged between them to be mounted in the base body. In accordance with the invention it is only necessary, for example, in the course of mounting the preassembled block, to insert the bearing means between the base body and the seated rotating body. In this way, it is possible to shorten the assembly time, resulting in fewer assembly errors.

For example, as described in WO 95/22017, the means for converting planetary movements of the toothed wheel into rotary movements of the output body can be a transformation element in the form of a cross, which is arranged, displaceable in two directions, between the toothed wheel and the rotating bodies. However, the means for converting planetary movements of the toothed wheel into rotary movements of the output body can also, as described in WO 2006/058743, be eccentric ring-shaped sleeves, which are arranged between recesses on the toothed wheel or on the rotating body, or pins arranged on the rotating body or on the toothed wheel, which project into recesses in the toothed wheel or the rotating body.

It is important to stress that, for fastening of the output body to the base body, one of the rotating bodies is preferably rotatably seated directly on or in the base body.

For fastening the output body on the base body, one of the rotating bodies can be rotatably seated directly on or in the base body for support, at least against axial forces, while the other rotating body is not seated in or on the base body, or is only indirectly rotatably seated in or on the base body or, for support against radial forces, is directly rotatably seated in or on the base body.

Preferably, one of the rotating bodies are rotatably seated directly on or in the base body, both for support against axial forces, as well as for support against radial forces.

Preferably, the rotating body which is rotatably seated directly on or in the base body is supported via seating means on the holding body, which can be, or is, fixedly connected to the one end face.

An advantageous embodiment of the invention provides that the seating means be arranged in the area of the end face on which the holding body is arranged. To this end, in contrast to the prior art, a gear in accordance with the invention is produced with substantially improved and simpler accessibility of the bearing surfaces for the rolling bodies of the seating means. A simplified positioning of the seating means is also produced.

Another advantageous embodiment of the invention is that bearing surfaces are provided (at least on the rotating body which is directly seated on or in the base body, and on the base body) for rolling bodies constituting the seating means for the rotating body in the base body. For example, the bearing surfaces can be in the form of flat areas and/or grooves with polished and hardened surfaces.

An additional advantageous embodiment of the invention provides that at least the seating means, as well as preferably associated bearing surfaces employed for supporting the rotating body seated directly on or in the base body against forces extending in the axial direction toward the interior tooth arrangement in the area of a means, used for the conversion of planetary movements of the toothed wheel into rotary movements of the output member and arranged on the same side of the interior tooth arrangement as the rotating body directly seated on or in the base body, are arranged radially offset toward the outside. An advantage resulting from this is that, because the rolling bodies constituting the seating means are displaced radially outward in the area of, for example, a conversion element, which converts the planetary movements of the toothed wheel into rotary movement of the output member, a gear of particularly compact exterior dimensions and in particular of a short structural length is created.

A preferred embodiment of the invention provides that at least the seating means—as well as the associated bearing surfaces continuously extending around the rotating shaft— which are intended for supporting the rotating body seated directly on or in the base body against forces extending in the axial direction, are arranged offset from the interior tooth arrangement in the direction of the rotating shaft with respect to a means used for converting planetary movements of the toothed wheel into rotary movements of the output member, and which is arranged on the same side of the interior tooth arrangement as the rotating body which is directly seated on or in the base body. An advantage arising from this embodiment is an increase in the available interior space for the movable parts located between the rotating bodies. This takes place because the rolling bodies constituting the seating means are axially offset with respect to the parts arranged between the rotating bodies and are arranged outwardly displaced. Because of this, the gear can be designed to be more rugged while having the same exterior diameter, since a larger structural space is available in the base body in the axial direction for the conversion elements, for example.

Another preferred embodiment of the invention provides that the seating means are embodied as ball-shaped rolling elements, which support the rotating body seated directly on or in the base body in the axial (and radial) direction, and which are arranged in a common ring-shaped space formed by the holding body, the base body, and the rotating body seated directly on or in the base body, and defined by bearing surfaces continuously extending around the rotating shaft. An advantage resulting from this arrangement is that only a single space is required for transmitting all axial and radial forces acting on the rotating body, via common rolling elements, to the base body and to the holding body, which is connected with the base body by means of fastening elements.

An additional preferred embodiment of the invention provides for the seating elements to be embodied as cylinder-shaped rolling elements, which support the rotating body directly seated on or in the base body in the axial (and radial) direction, and which are arranged in a common ring-shaped space defined by the holding body, the base body, and the rotating body. Moreover, the cylinder-shaped rolling elements are directly seated on or in the base body and is respectively inclined by 45° with respect to the rotating shaft and by the bearing surfaces continuously extending around the rotating shaft, and are arranged in the area of the front on which the holding body is arranged. An advantage of this embodiment is that, in contrast to the ball-shaped rolling elements, the cylinder-shaped rolling elements can support greater loads because they rest in a line shape, instead of a point-shaped, manner on the respectively assigned bearing surfaces.

In accordance with a preferred embodiment of the invention, the gear has a cover which protects the movable parts in the interior of the gear against dirt on the side facing a rotating body which is not-seated, or only indirectly seated on or in the base body, or seated only for support against radial forces directly on or in the base body.

The cover preferably has a central opening, through which the input member is introduced, for example, to connect to a drive motor.

To prevent the penetration of dirt into the gear, a circumferential seal may be arranged in the area of the central opening between the cover and the input member.

In a particularly preferred embodiment, a bearing surface for seating bodies is formed on the cover, on which the input member is seated with its side facing a rotating body which is not-seated, or only indirectly seated on or in the base body, or seated only for support against radial forces directly on or in the base body. In this way, no axial forces act on the non-seated rotating body, and the connecting elements connecting the two rotating bodies to each other need not transmit any axial forces between the rotating bodies.

A circumferential seal should be provided between the rotating body directly seated on or in the base body, which prevents the penetration of dirt into the gear on the driving side.

In accordance with a preferred embodiment of the invention, the side of the gear facing the rotating body directly seated on or in the base body is embodied as the power take-off side, and the side of the gear facing the rotating body which is not-seated, or only indirectly seated on or in the base body, or seated only for support against radial forces directly on or in the base body, is embodied as the driving side of the gear. Experience has shown that the loads on the power take-off side are greater than on the driving side, for which reason it is advantageous to design the power take-off side of the seated rotating body in such a way that the moment acting on the seating elements in this way, and the resultant pairs of forces, are reduced.

SUMMARY

Accordingly, a gear in accordance with the invention is comprised of a hollow cylinder-like base body having an interior tooth arrangement, as well as a rotating shaft and end faces. A driven input member and output member are rotatably seated in the base body. The output member is comprised of two rotating bodies which can be, or respectively are, connected to each other in a secure manner to avoid twisting. The rotating bodies have a cross section which is circular transversely in respect to the rotating shaft. At least one toothed wheel is arranged between the rotating bodies. The toothed wheel preferably meshes with the interior tooth arrangement. Means for converting planetary movements of the toothed wheel into rotating movements of the output body are arranged between the rotating bodies. The forces which hold the output member of the gear together are independent of the seating forces acting between the output member and the base body.

So that the forces holding the output member together are independent of the seating forces acting between the output member and the base body, it has been preferably provided that the axial forces holding the output member together will be, or respectively are, applied between the rotating bodies of the output member. The axial seating forces acting between the output member and the base body will be, or respectively are, only applied between one of the two rotating bodies of the output member and the base body.

The axial forces keeping the output member together will be, or respectively are, preferably supplied by means acting between the rotating bodies of the output member.

The axial seating forces acting between the output member and the base body will be, or respectively are, supplied with the aid of means for acting only on one of the two rotating bodies of the output member.

It is evident that the invention can be accomplished in any event at the point at which, in a conventional planetary gear, the compact output member is regularly seated with two rotating bodies extending parallel to, and at a distance between each other, in such a way that, of the two rotating bodies, only a single rotating body is directly seated in or on the base body. The two rotating bodies constitute the end faces of the output member and the base body. The exterior forces acting on the output member in the course of operation, at least in the axial direction, are for all practical purposes completely taken up by the rotating body seated directly in or on the base body. The other rotating body located on the other side of the base body is for all practical purposes not subjected to exterior forces and, in particular, is not subjected to exterior forces acting in the axial direction. This rotating body also is not in working contact with the base body. The only important force acting on the rotating body (which is not rotatably seated on or in the base body, or is only indirectly rotatably seated on or in the base body, or is only directly rotatably seated in or on the base body as a support against radial forces), is the static force produced by the connecting means, normally screws, for keeping the output member—which is designed as a unit—together. With this constellation, it can be assured that the working forces acting indirectly or directly, at least in the axial direction on the rotating body seated in or on the base body, are not transferred to the other rotating body. As a result, the only areas of the gear which must be worked at high precision are the contacting and bearing surfaces of the base body, the rotating body seated indirectly in or on the base body, and the holding body, which are provided for seating the output member. Since these surfaces are accessible without problems from one direction of the gear, it is possible to cut the production time of the gear in half. A further advantage of the steps in accordance with the invention is that the active interior space of the gear is noticeably increased by the special positioning of the seating elements, therefore considerably increasing the output of the gear without changing the exterior dimensions, and the weight of the gear is reduced.

In general, the basic idea of the invention can be applied to all types of planetary gears. In accordance with the invention, preferably only one of the rotating bodies is seated directly on the base body, at least with respect to the axial forces, for obtaining the independence of the seating forces and of the forces keeping the rotating bodies together. Furthermore, a ring-like holding body, which can be fixedly connected with one end face, is preferably provided, on which the rotating body, which is directly seated on the base body, is supported via bearing means. The holding body can be preferably embodied as a thick-walled, and easy to work, pipe section, whose two end faces merely need to be grounded and provided with suitable openings for screws, without any problems. The rotating body seated directly on the base body can furthermore be supported on the base body via the same, or other, seating means.

FIGURES

Figure 1A:
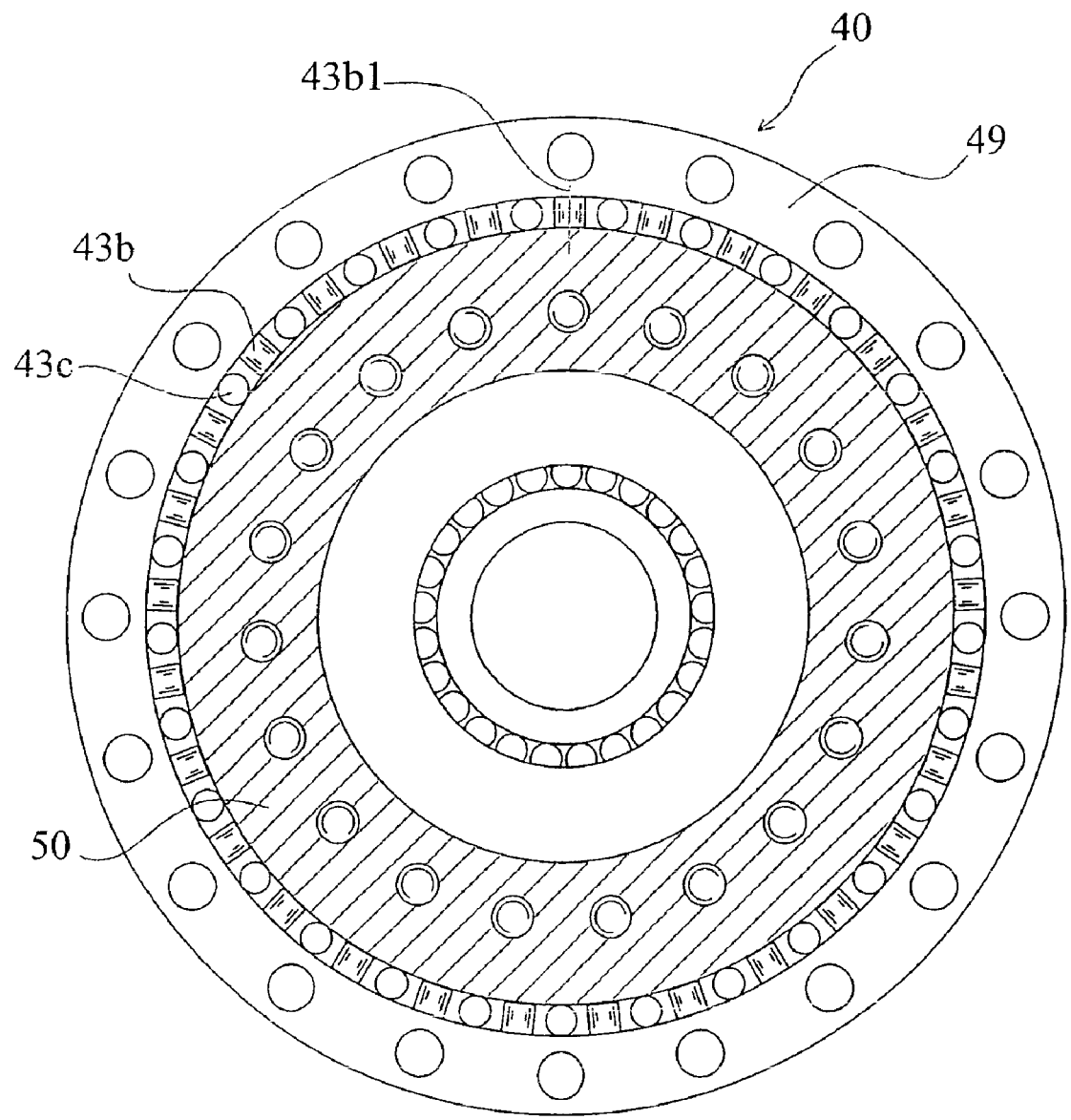
Figure 1B:
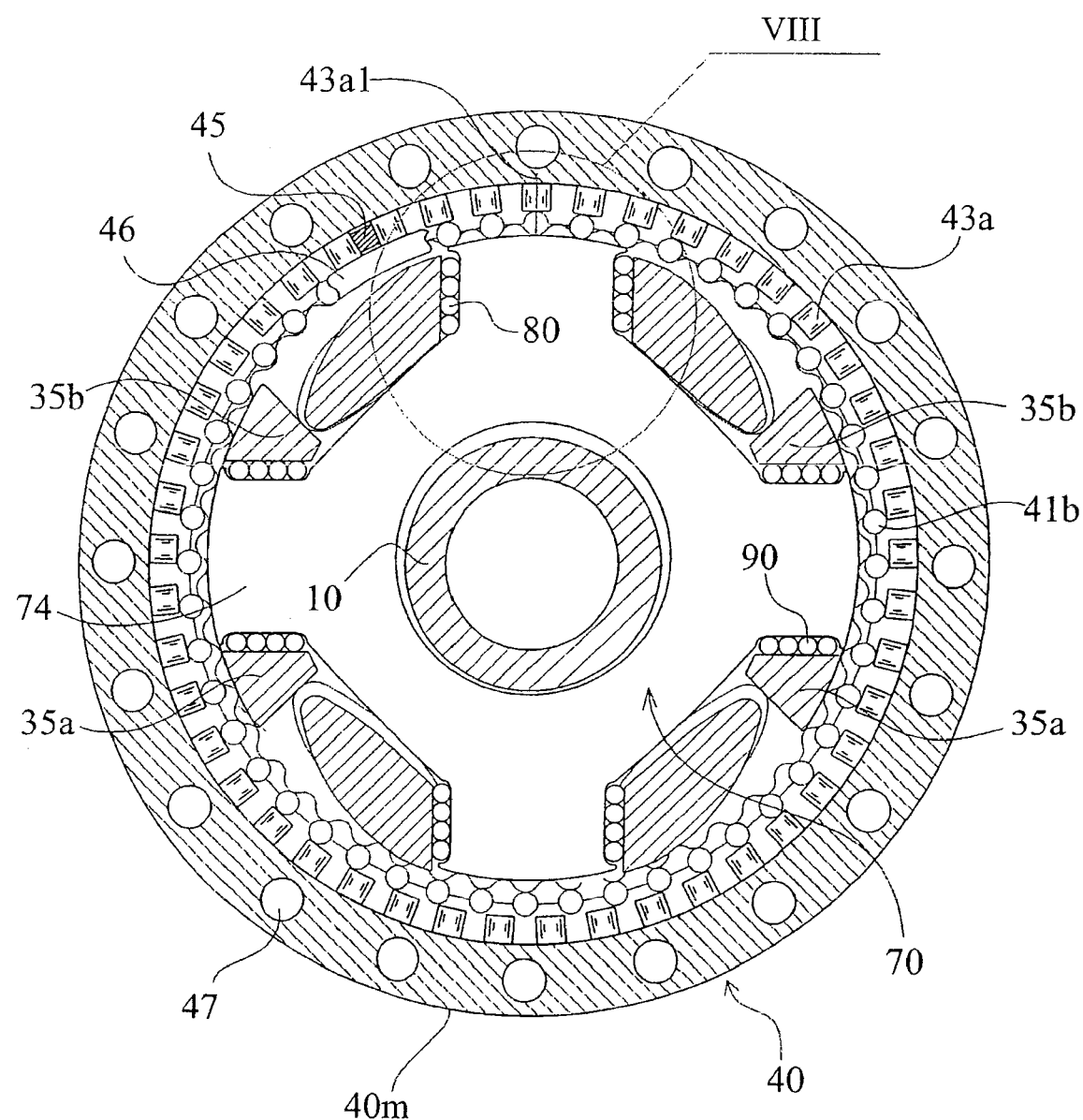
Figure 1C:
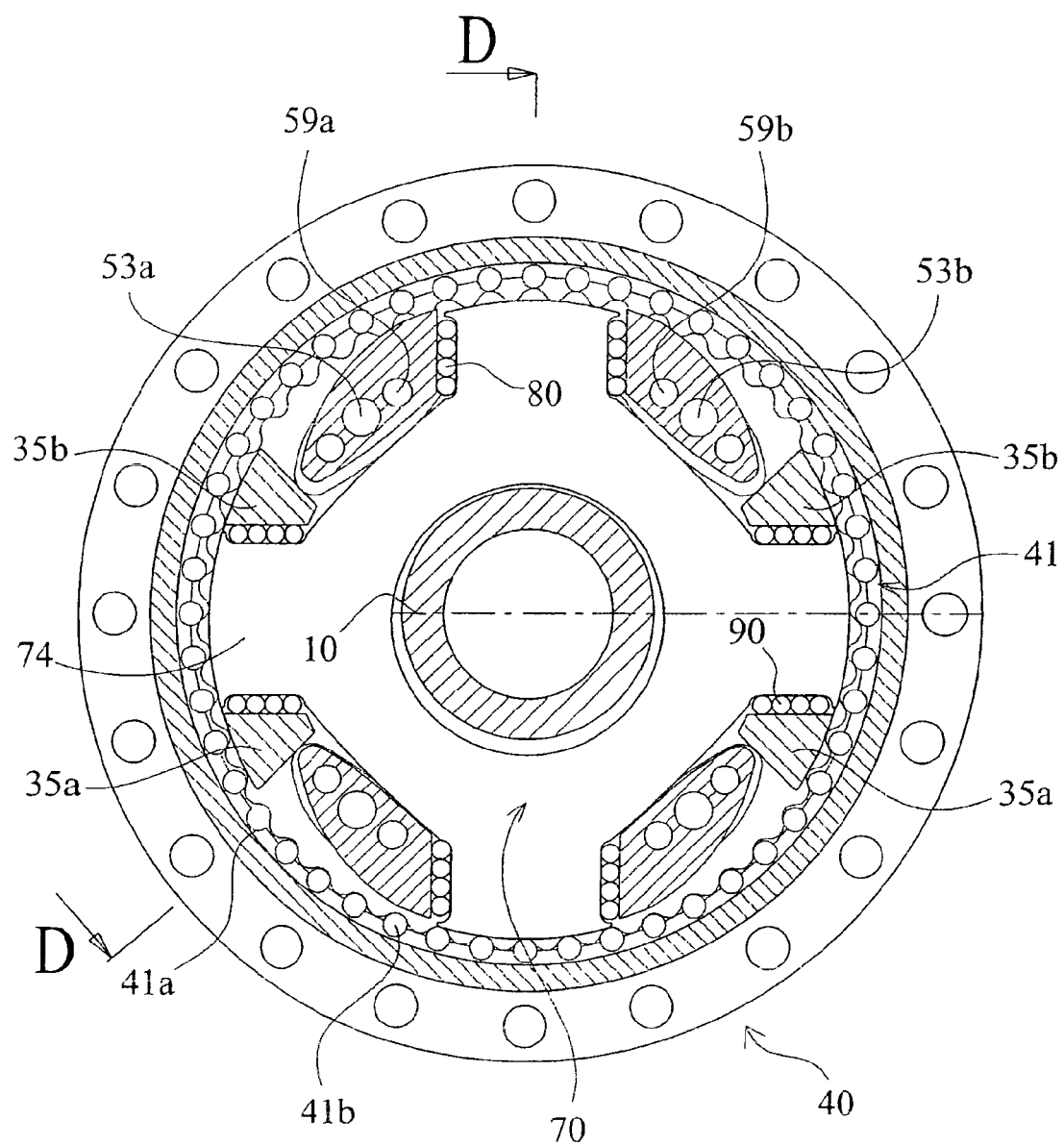
Figure 1D:
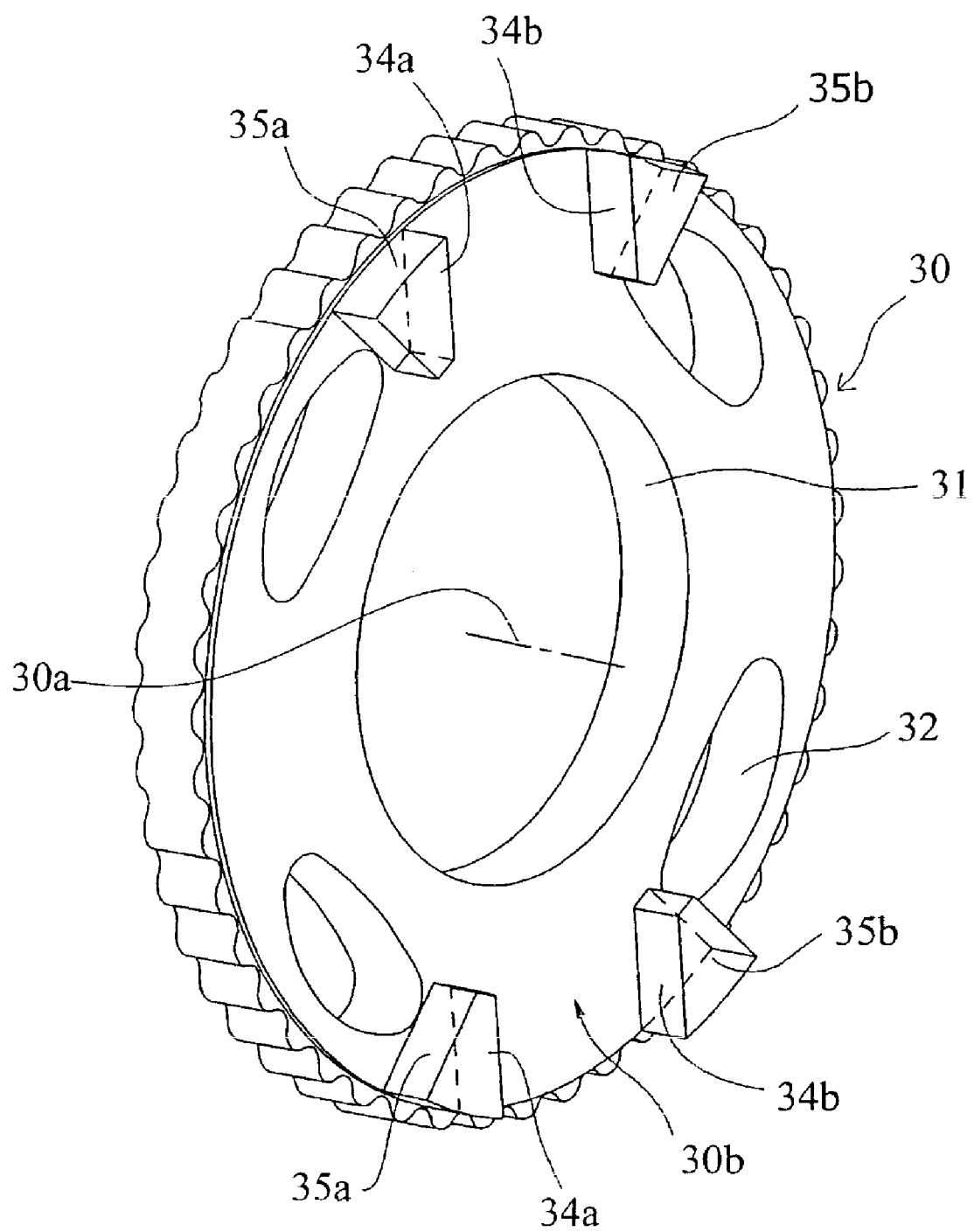
Figure 1E:
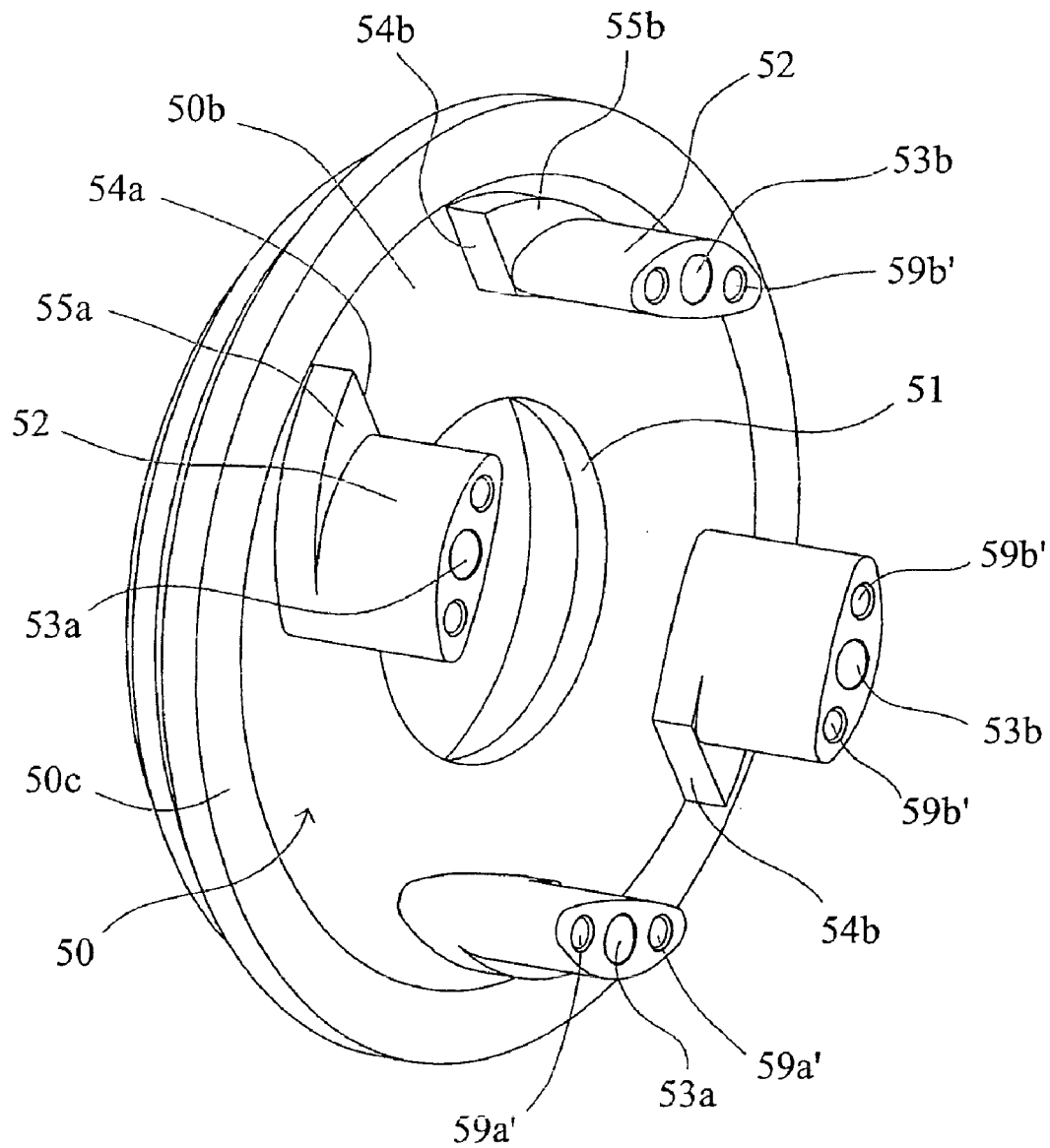
Figure 1F:
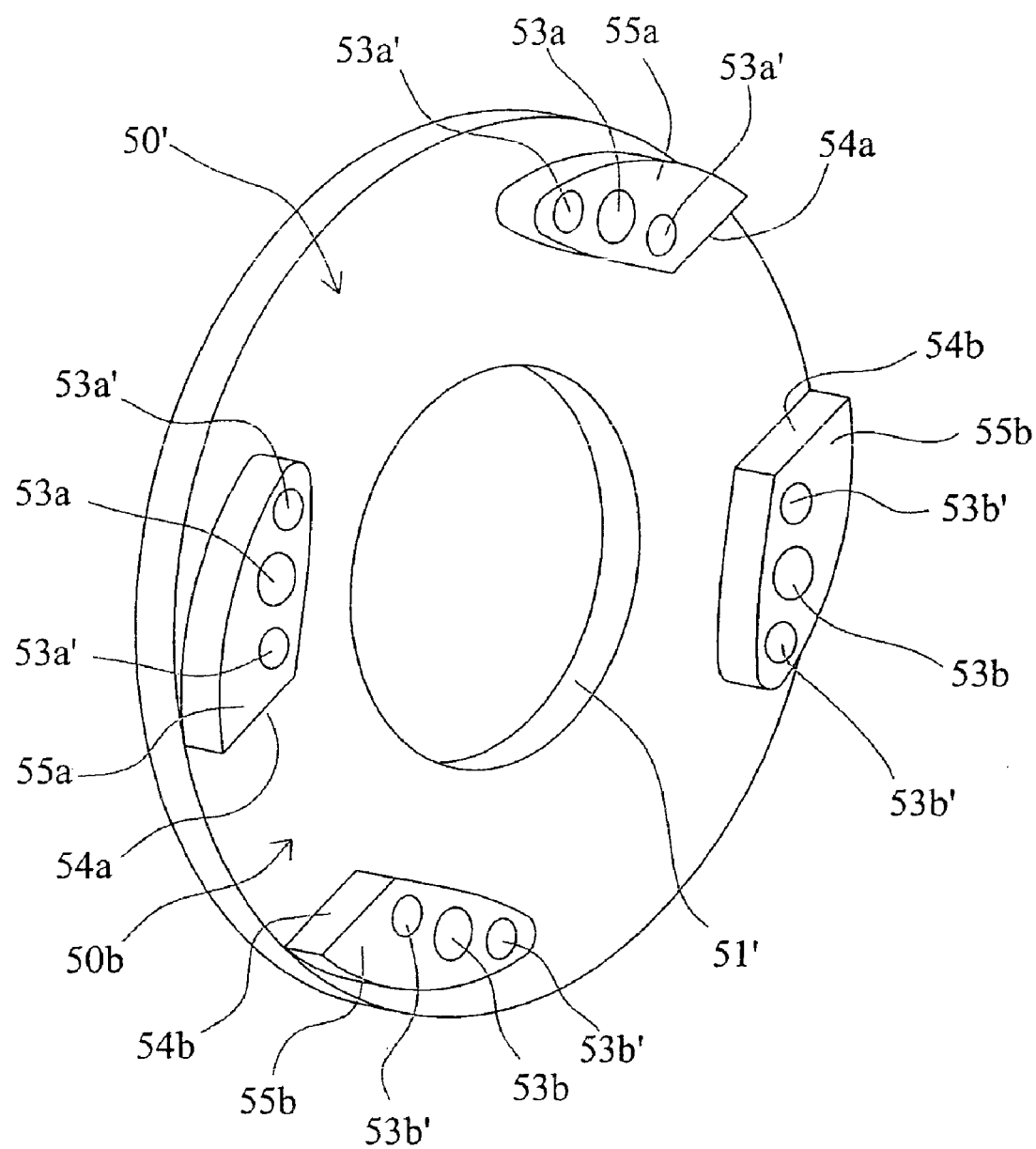
Figure 1G:
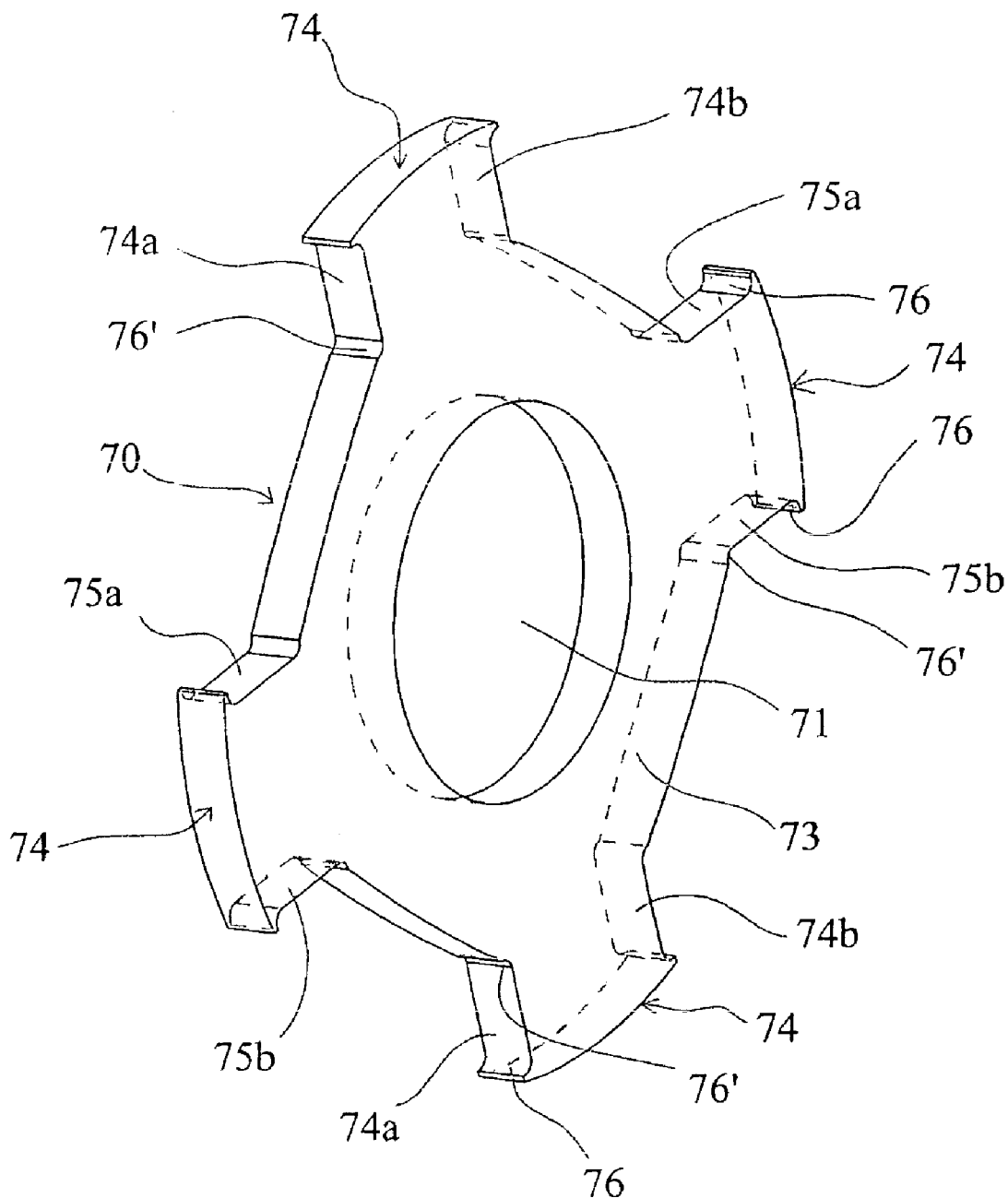
Figure 2:
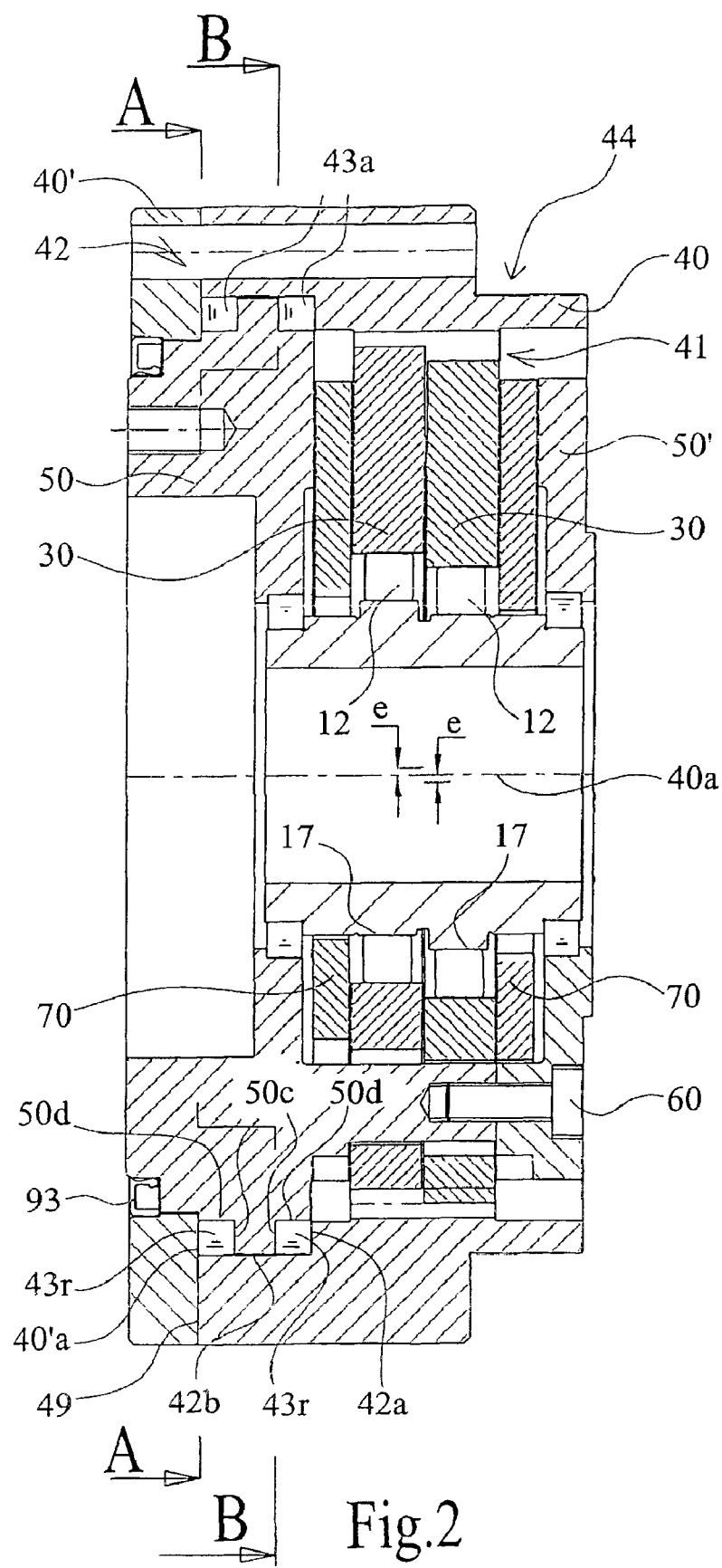
Figure 2A:
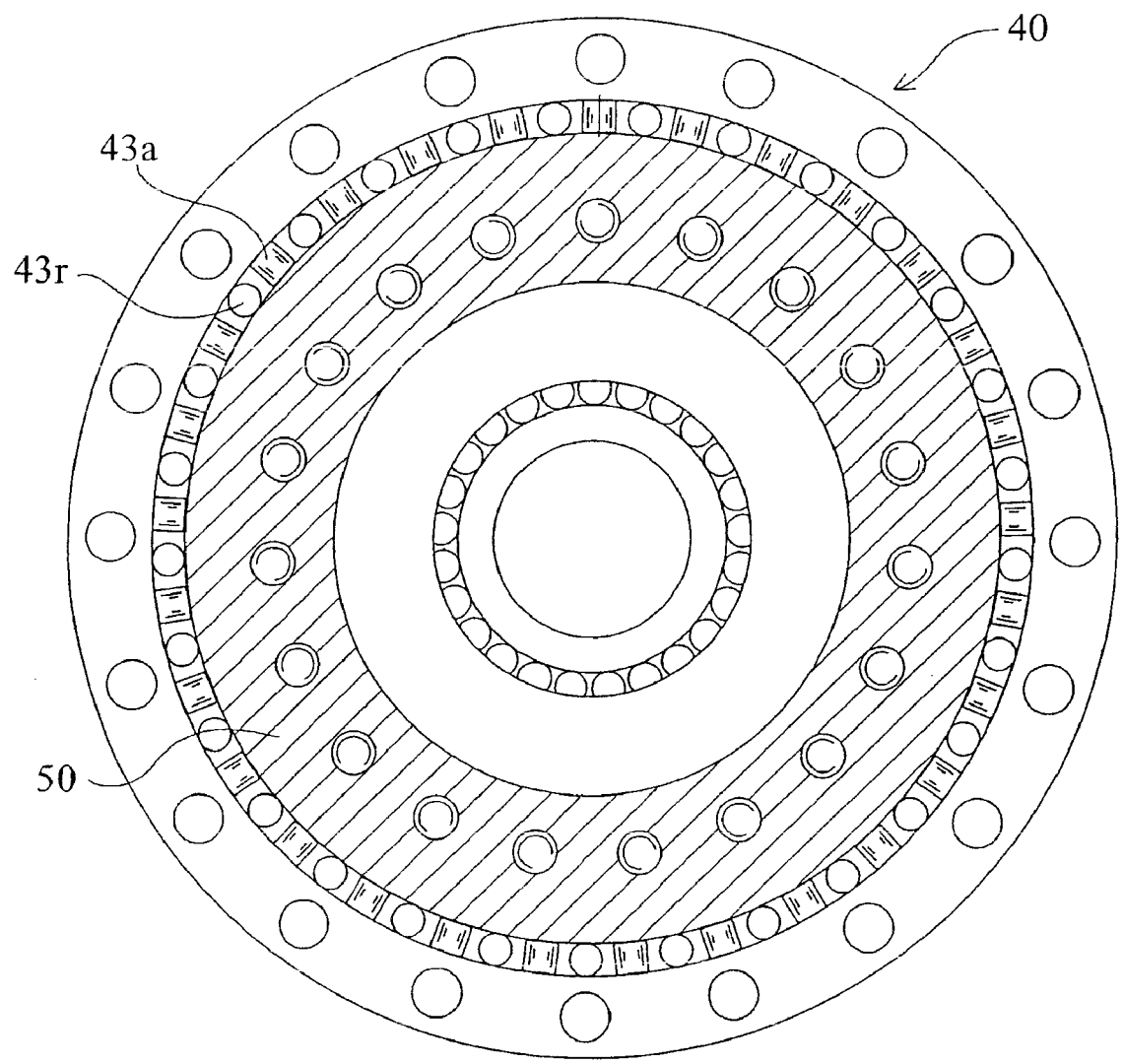
Figure 3:
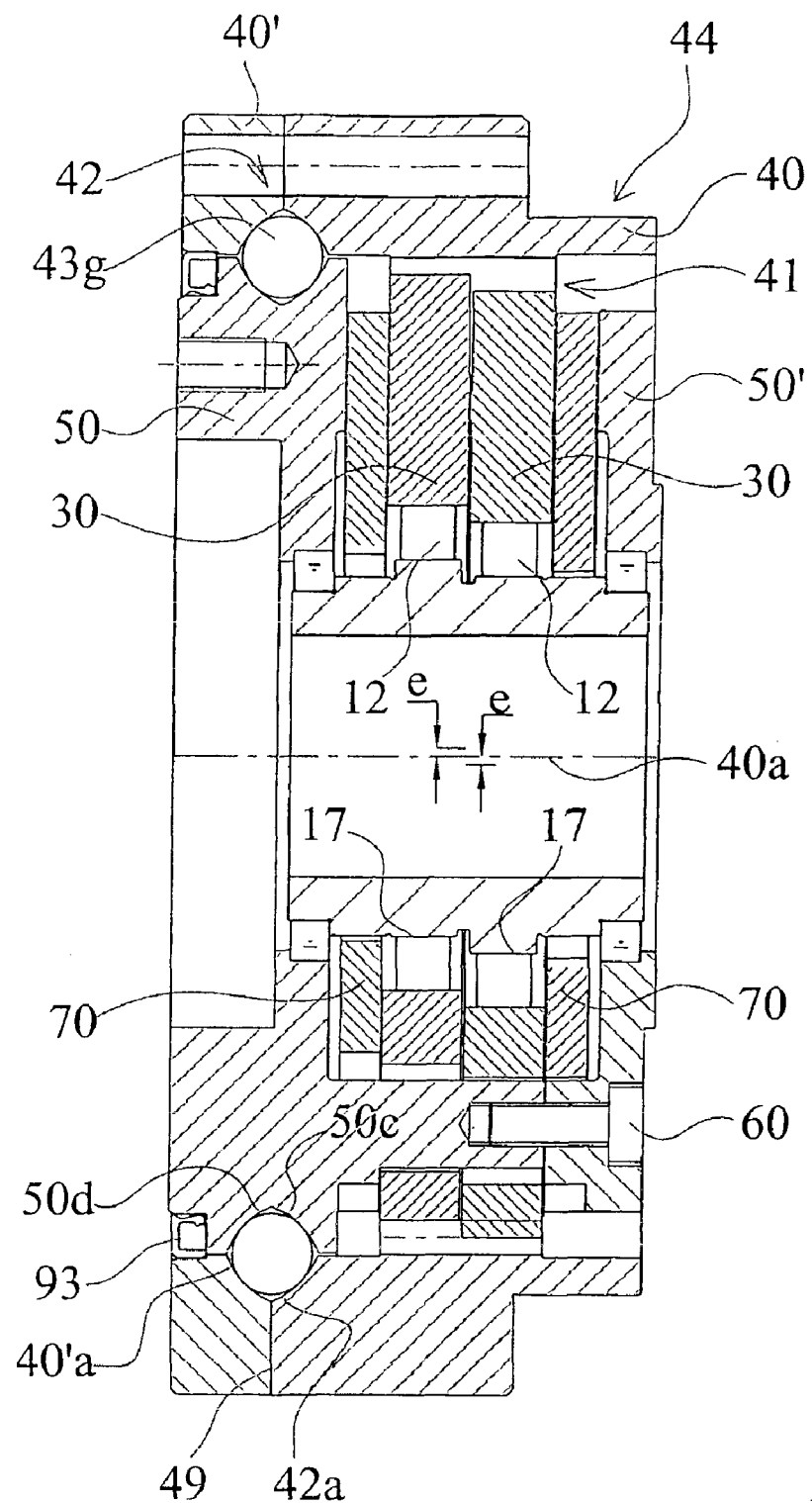
Figure 4:
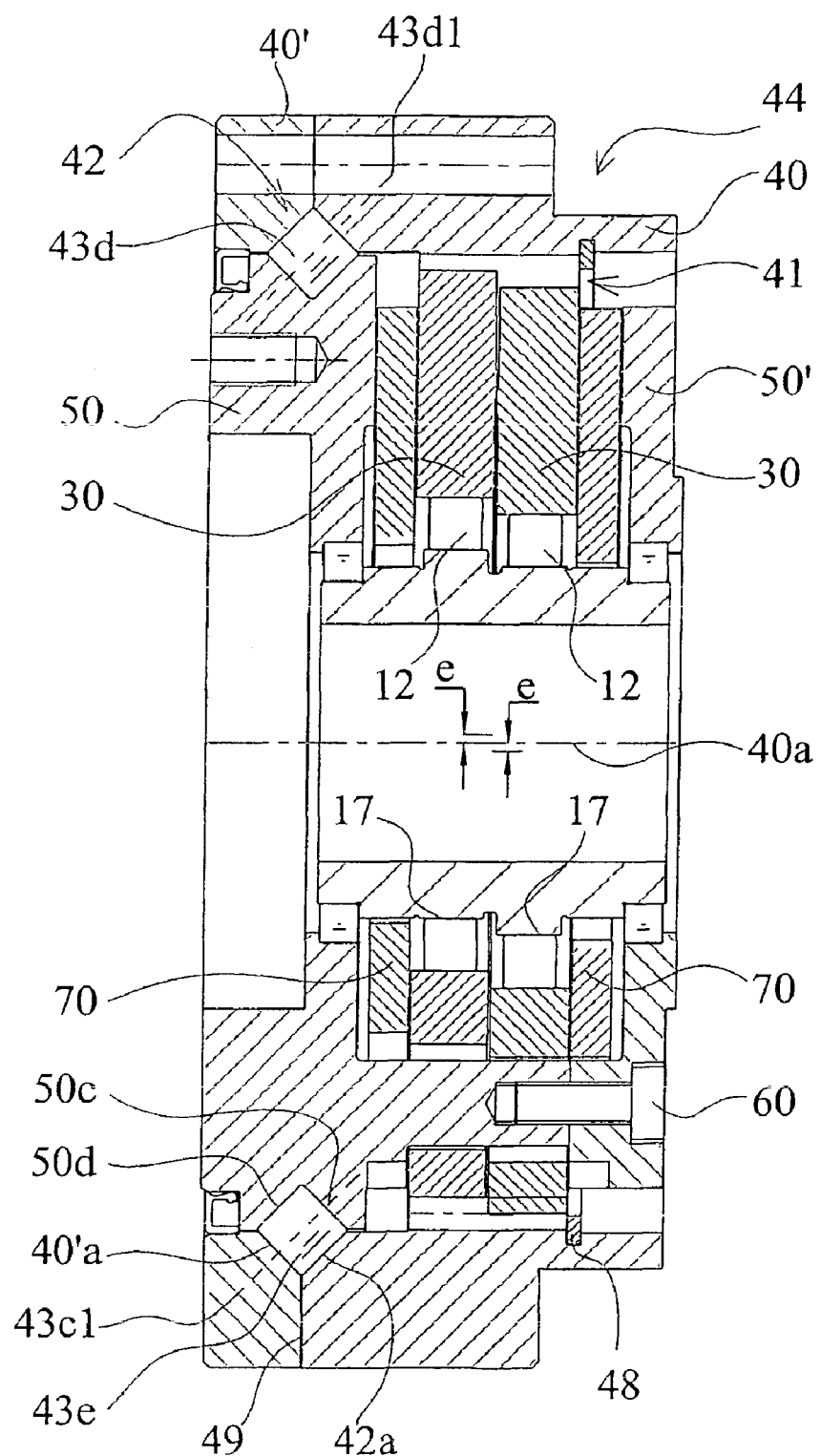
Figure 5:
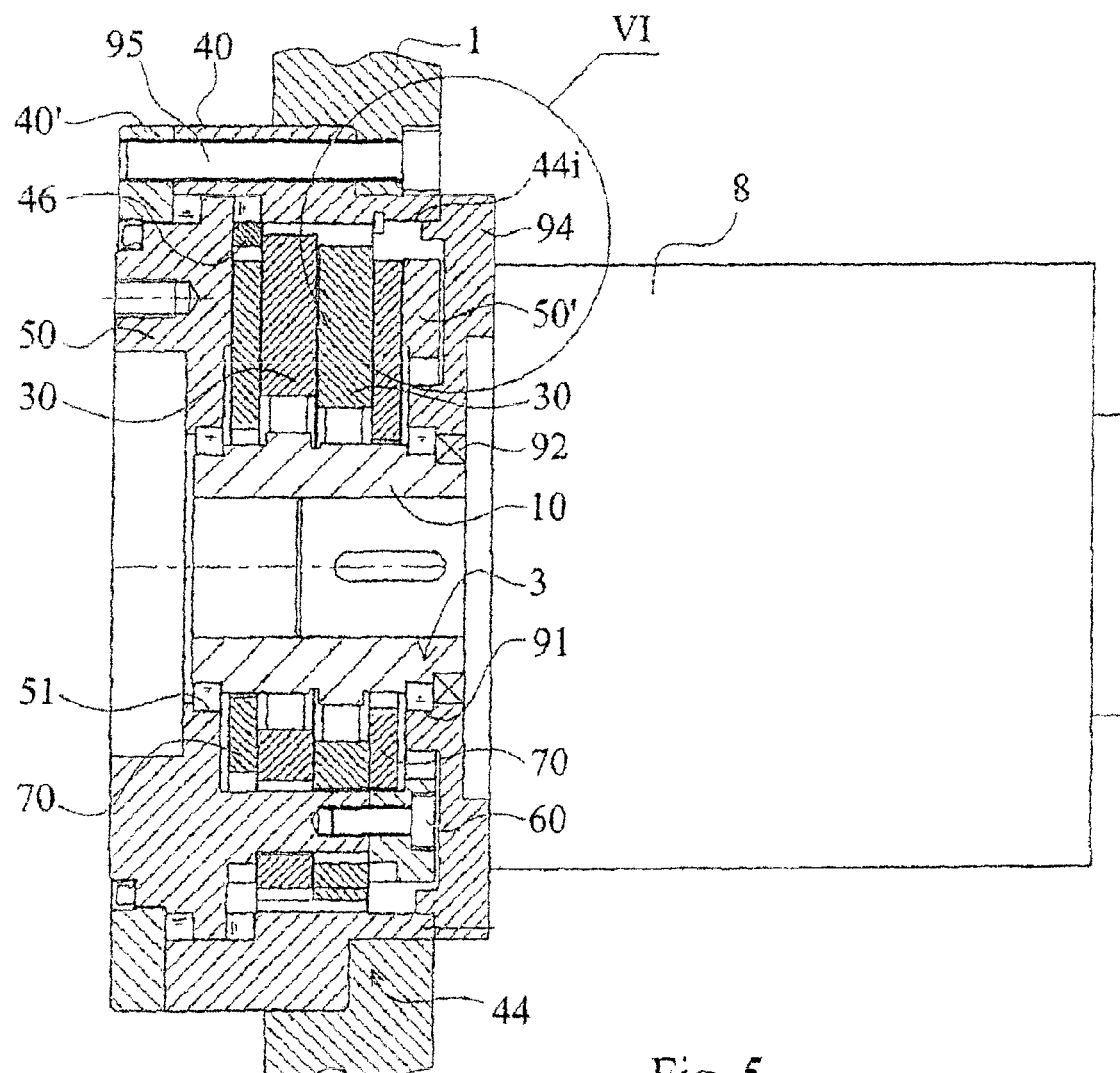
Figure 8:
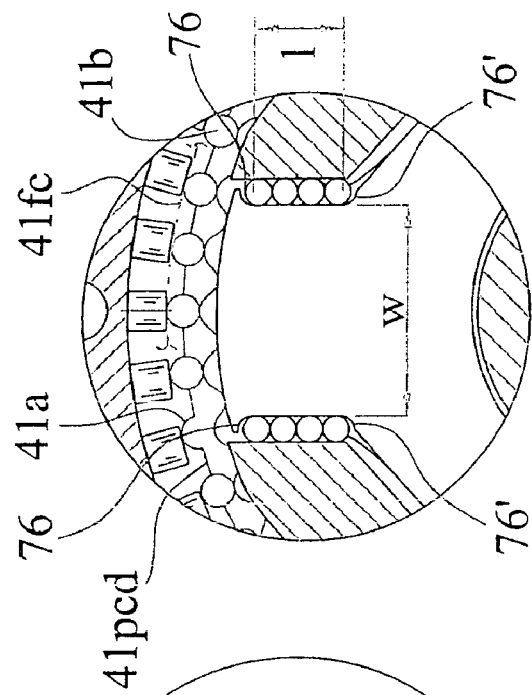
Figure 7:
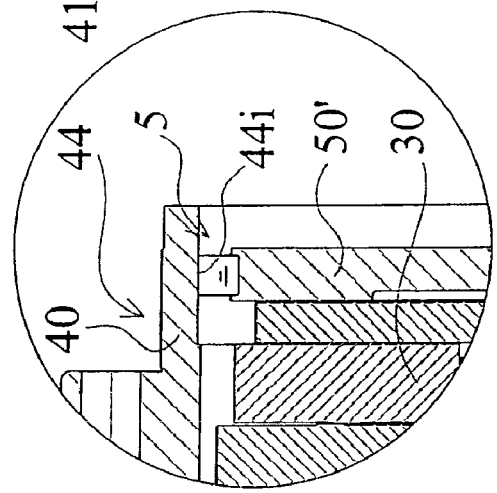
Figure 6:
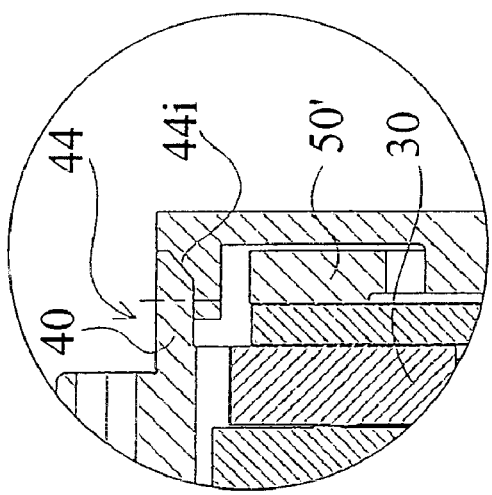
Figure 9:
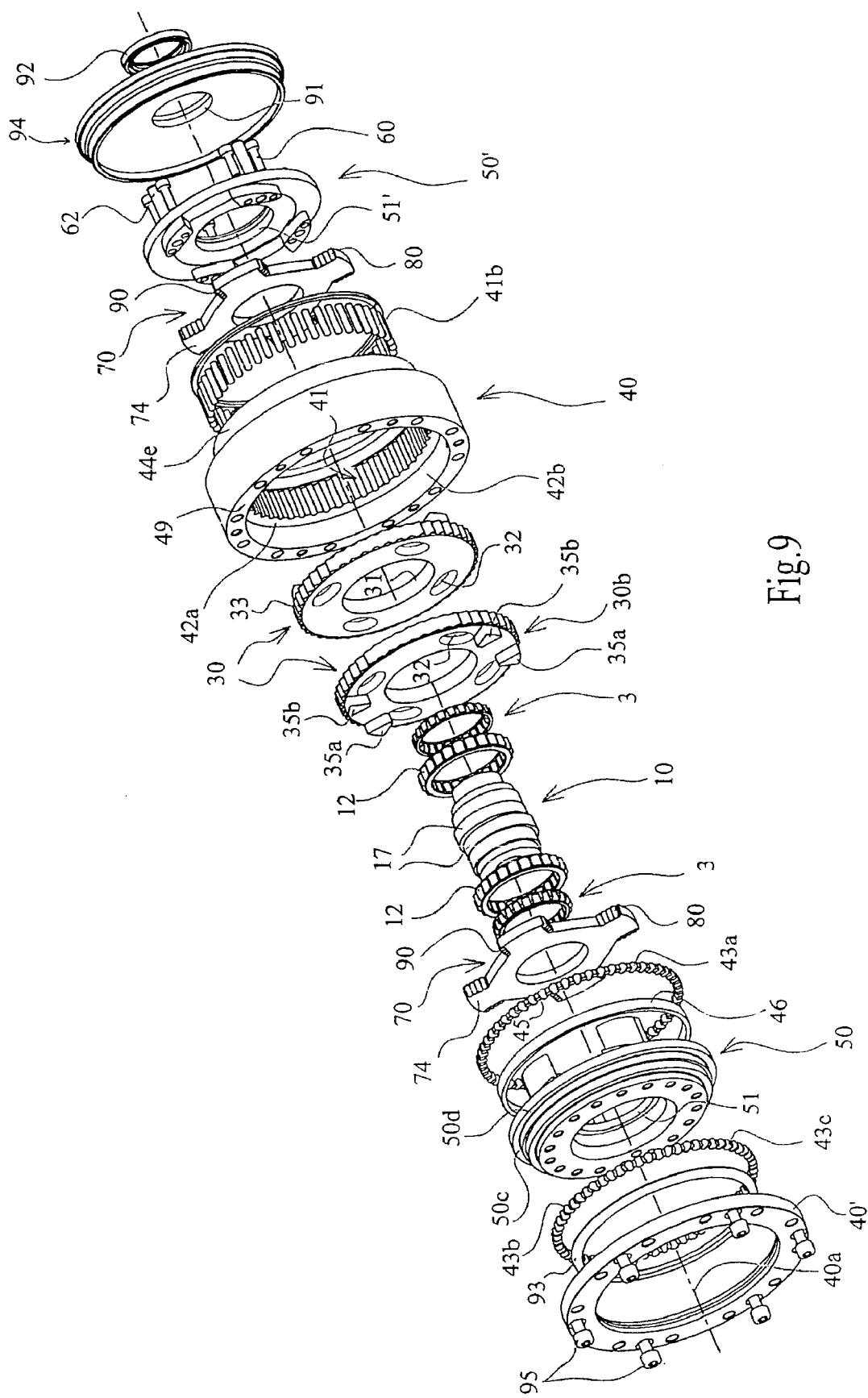

FIG. 1, a schematic representation of a first exemplary embodiment of a gear in accordance with the invention in cross section, FIG. 1a, a section along the line A-A in accordance with FIG. 1, FIG. 1b, a section along the line B-B in accordance with FIG. 1, FIG. 1c, a section along the line C-C in accordance with FIG. 1, FIG. 1d, a perspective representation of a toothed wheel of the gear in accordance with FIG. 1, FIG. 1e, a perspective representation of a first portion of a first rotating body of the gear in accordance with FIG. 1, constituting an output member, FIG. 1f, a perspective representation of a second portion of a second rotating body of the gear in accordance with FIG. 1, constituting an output member, FIG. 1g, a perspective representation of a conversion element of the gear in accordance with FIG. 1, FIG. 2, a schematic representation of a second exemplary embodiment of a gear in accordance with the invention in cross section, FIG. 2a, a section along the line B-B in accordance with FIG. 2, FIG. 3, a schematic representation of a third exemplary embodiment of a gear in accordance with the invention in cross section, FIG. 4, a schematic representation of a fourth exemplary embodiment of a gear in accordance with the invention in cross section, FIG. 5, a schematic representation of a fifth exemplary embodiment of a gear in accordance with the invention in cross section, FIG. 6, a first exemplary embodiment of the detail VI in FIG. 5, FIG. 7, a second exemplary embodiment of the detail VI in FIG. 5, FIG. 8, the detail VII in FIG. 1b, as well as FIG. 9, an exploded representation of the gear in FIG. 5.

LIST OF REFERENCE NUMERALS

1 Frame
3 Seating Body
4 Continuous opening in the input member
5 Radial seating body
10 input member
12 Rolling element
30 Toothed wheel
30a Axis of the toothed wheel
30b Linear guide in the toothed wheel
31 Interior bearing surface
32 Axial opening
33 Exterior toothing
34a,34b Guide track of the linear guide on the toothed wheel
35a,35b Projections on the toothed wheel
Base body
40' Holding body
40a Rotating shaft
40'a Bearing surface on the holding body
41 Interior toothing on the base body
41a Axial grooves on the interior circumference of the base body
41b Needle-shaped rolling body arranged in the axial grooves
41pc Inner circle of the interior toothing
41fc Outer circle of the interior toothing
42 Bearing surface
42b Bearing surface
43a Cylinder-shaped rolling element
43b Cylinder-shaped rolling element
43c Cylinder-shaped rolling element
43d Cylinder-shaped rolling element
43e Cylinder-shaped rolling element
43g Ball-shaped rolling element
43r Cylinder-shaped rolling element
43a1 Axis
43b1 Axis
43c1 Axis
43d1 Axis
43e1 Axis
44 Step
44a Exterior end face
44e Circumferential shell surface
44i Interior centering surface 45 Bearing cage
46 Support body
47 Openings for fastening means
49 End face
50 Seated rotating body
50' Non-seated rotating body
51,51' Central opening
52 Spacing body
53a,53b Opening
54a,54b Guide track
55a,55b Projection
59a,59b Threaded receptacle
60,62 Connecting elements
70 Conversion element
71 Central opening of the conversion element
73 Central portion of the conversion element
74 Arm of the conversion element
74a,74b Guide tracks for the toothed wheel on the arm of the conversion element
75a,75b Guide tracks for the rotating body on the arm of the conversion element
76,76' Delimiting face
80,90 Rolling element
91 Bearing surface
92 Seal
93 Seal
94 Cover
95 Fastening means
e Eccentricity
w Width of an arm of the conversion element
l Effective length of the running tracks on the arm of the conversion element

DESCRIPTION

The gears, which are shown completely or in parts in FIGS. 1 to 9, all consist of a hollow-cylindrical base body 40, which has an interior tooth arrangement 41, as well as a rotating shaft 40a, and end faces 49, in which a driven input member 10, as well as an output member are rotatably seated. The output member is comprised of two rotating bodies 50, 50'. The rotating bodies are designed to be substantially disk-shaped. The disk-shaped portions of the rotating bodies 50, 50' are arranged at a distance from each other. The rotating bodies 50, 50' can be, or are, fixedly connected with each other. The rotating bodies 50, 50' have a circular cross section oriented transversely in respect to the rotating shaft 40a. Two toothed wheels are arranged between the rotating bodies 50, 50'. With their exterior tooth arrangements 33, the toothed wheels 30 mesh with the interior tooth arrangement 41 of the base body 40.

Furthermore, means for converting the planetary movements of the toothed wheels 30 into rotary movements of the output member are arranged between the rotating bodies 50, 50'. In the gears represented in FIGS. 1 to 9, only one of the respective two rotating bodies 50, 50', namely the rotating body 50, is directly seated in the base body 40. Furthermore, a ring-shaped holding body 40' is provided, which can be fixedly connected with the end face 49. The rotating body 50 is supported by means of rolling elements 43a, 43b, 43c (FIGS. 1 and 9), or respectively 43a, 43r (FIG. 2), or respectively 43g (FIG. 3), 43d, 43e (FIG. 4), both in the axial, as well as the radial direction, directly on the base body 40 and on the holding body 40' arranged on the end face 49.

Here, the functional structure of the movable parts arranged between the rotating bodies 50, 50' in the base body 40 is identical in all exemplary embodiments represented in FIGS. 1 to 9. An input member 10 in the form of an input shaft has two eccentric sections 17, which are arranged offset by 180° in relation to each other. The eccentric sections 17 are offset in relation to the rotating shaft 40a by an eccentricity e. A toothed wheel 30 is rotatably seated in each one of the eccentric sections 17. Thus, the eccentricity e corresponds to the distance between the axis 30a of the toothed wheel 30 and the rotating shaft 40a of the base body 40. For reducing frictional losses, rolling elements 12 are arranged between the eccentric sections 17 and the toothed wheels 30 and respectively roll off on the exterior circumference of the eccentric sections 17. For this purpose, bearing surfaces for the rolling elements 12 have been formed on the circumference of the eccentric sections 17 and are used as seating bodies for the toothed wheels 30. The toothed wheels 30 have exterior tooth arrangements 33 and central openings with interior bearing surfaces 31 for the rolling bodies 12.

The toothed wheels 30 have several axial through-openings 32, which are arranged offset in the radial direction in respect to the central opening pointing toward the interior bearing surface and are respectively evenly distributed around the axes 30a of the toothed wheels 30. The axes 30a of the toothed wheels 30 extend parallel with the rotating shaft 40a of the input member 10 and of an output member constituted by two rotating bodies 50, 50'. The rotating shaft 40a is simultaneously the axis of symmetry of the base body 40. As represented in FIG. 5, the input member 10 is connected by means of a spring, not represented in detail, with a motor shaft of a drive motor 8. The drive motor 8 is connected with the base body 40, embodied as a hollow wheel with interior toothing 41, by means of a cover 94 and non-represented screws. The drive motor 8 is arranged on the side of the gear facing away from the rotating body 50 seated in the base body 40. This side constitutes the driving side, while the rotating body 50 seated in the base body 40 constitutes the power take-off side of the gear.

The toothed wheels 30 are arranged in the center between the two rotating bodies 50, 50', which are embodied with a circular outer contour, or respectively have a circular cross section transversely to the rotating shaft 40a and are releasably connected with each other and together constitute the output member of the gear. Spacing bodies 52 are arranged on the rotating body 50, which have openings 53a, 53b and threaded receivers 59a, 59b for receiving the connecting elements 60, 62. The spacing bodies pass without contact through the openings 32 of the toothed wheels 30, so that the rotating bodies 50, 50' can be fixedly connected with each other through the toothed wheels 30. In relation to the base body 40 with interior toothing 41, the output member constituted by the rotating bodies 50, 50', which are connected to each other, is rotatably seated around the rotating shaft 40a.

The interior toothing 41 of the base body 40 meshes with the exterior teeth of the toothed wheels 30. The axes of the toothed wheels 30 are arranged parallel with the rotating shaft 40a of the base body 40, but are offset by the eccentricity e. The rotating bodies 50, 50' are provided with guide tracks 54a, 54b, which define a linear guide 50b. The linear guide 50b is oriented transversely in relation to the rotating shaft 40a. Each toothed wheel 30 is provided with a guide track 34a, 34b, which define a linear guide 30b, and this linear guide 30b is oriented transversely to the axis 30a of the toothed wheel 30. A conversion element 70, embodied as a cross, is arranged on both sides of the gear between the rotating bodies 50, or respectively 50'. The conversion element 70 has guide surfaces 74a, 74b, or respectively 75a, 75b, arranged in two orthogonal directions in respect to each other, which work together with the linear guides 50b and 30b of the respective rotating body 50, 50', or respectively of the toothed wheel 30, in such a way that the conversion element 70 is arranged displaceable in two directions, which extend perpendicularly in respect to each other, in relation to the respective rotating body 50, 50' one the one hand, and in relation to the toothed wheel 30, on the other hand. The one linear guide 50b is embodied on the rotating body 50, or respectively 50', while the conversion element 70 is arranged, displaceable in the other direction, in the linear guide 30b on the toothed wheel 30.

Both rotating bodies 50, 50', as well as the conversion elements 70, have central openings 51, 51', or respectively 71. On both its ends, the input member 10 is seated in the central openings 51, 51' of the rotating bodies 50, 50'. On their interior surfaces, the central openings 51, 51' form bearing surfaces for seating bodies 3. The ends of the input member 10 are seated in the central openings 51, 51' of the rotating bodies 50, 50' by means of the seating bodies 3. The input member 10 passes through the opening 71 of the conversion element 70 in a contact-free manner. In this case, the interior diameter of the opening 71 is larger by at least 2e than the exterior diameter of that section of the input member 10 passing through the opening 71. The guide tracks 54a and 54b, with which each rotating body 50, 50' is provided, are formed on the oppositely located sides of the projections 55a and 55b. The projections 55a and 55b are embodied as axially symmetrical pairs and arranged on the end face of the respective rotating body 50, 50'. The guide tracks 54a and 54b are formed directly on the projections 55a and 55b of the rotating bodies 50, 50'. They can also be embodied as flat strips, which can be fastened on the oppositely located sides of the projections 55a, 55b.

The guide tracks 34a, 34b with which each toothed wheel 30 is provided, are formed on oppositely located sides of the projections 35b. They are formed by centrally, oppositely located pairs which are formed on the front side of the toothed wheel 30. The axial openings 32 of the toothed wheel 30 are arranged on an arc of a circle and evenly distributed between the projections 35a, 35b. The guide tracks 34a, 34b are formed directly on the projections 35a, 35b of the toothed wheel 30. However, they can also be embodied as flat strips, which are fixedly formed on the oppositely located sides of the projections 35a, 35b.

The conversion element 70 comprises a ring-shaped central portion 73, as well as four arms 74 arranged on the ring-shaped central portion 73. An opening 71 is arranged in the ring-shaped central portion 73, through which the input member is conducted in a contactless manner. The one pair of the oppositely located arms 74 has guide tracks 75a, 75b, by means of which the conversion element 70 is displaceably arranged in the linear guide 50b of the rotating body 50. The second pair of oppositely located arms 74 also has parallel guide tracks 74a, 74b, by means of which the conversion element 70 is displaceably arranged in the linear guide 30b of the toothed wheel 30. Cylindrical rolling elements 80 are arranged between the guide tracks 54a and 54b of the linear guide 50b of the rotating body 50 and the guide tracks 75a, 75b of the conversion element 70, by means of which the conversion element 70 is displaceably arranged in the linear guide 50b. Cylindrical rolling elements 90 are also arranged between the guide tracks 34a and 34b of the linear guide 30b on the toothed wheel 30 and the guide tracks 74a, 74b of the conversion element 70, by means of which the conversion element 70 is displaceably arranged in the linear guide 30b. In both cases, guidance of the conversion element 70, when it performs oscillating movements in respect to the toothed wheel 30, as well as in respect to the rotating body 50 and the rotating shaft 40a, is assured by means of rolling elements 80, 90. For delimiting the guide tracks 74a, 74b, 75a, 75b, delimiting faces 76, 76' have been formed on the arms 74 of the conversion element 70 and limit the movement of the rolling elements 80, 90.

In this regard, FIG. 8 shows in detail how the rolling elements 80, 90 are arranged in the mounted state between the guide tracks 74a, 74b, or respectively 75a, 75b formed on the arms 74. The delimiting faces 76, 76' delimit the effective length l of the guide tracks 74a, 74b, or respectively 75a, 75b on the arms 74 along which the rolling elements 80, 90 can move. The width of an arm 74 is indicated by w. Moreover, it can be seen in FIG. 8 that the inner circle 41pc of the interior toothing 41 extends through the axes of symmetry of the needle-shaped rolling bodies 41b arranged in the axial grooves 41a. The outer circle 41fc of the interior toothing 41 extends through the bottom of the axial grooves 41a.

The interior toothing 41 of the base body 40 consists of needle-shaped rolling bodies 41b seated in axial grooves 41a on the interior circumference of the base body 40. The axial grooves 41a are evenly distributed over the interior circumference of the base body 40. Thus, they are toothed wheels whose teeth preferably consist of prone cylinders. The exterior toothing 33 of the toothed wheel 30 is correspondingly wave-shaped.

The spacing bodies 52 are arranged on the projections 55a, 55b of the rotating body 50. These spacing bodies 52 pass through the axial openings 32 of the toothed wheel 30 with ease and are provided with axial receptacles 53a, 53b, as well as with threaded receptacles 59a, 59b. The receptacles 53a, 53, and the threaded receptacles 59a, 59b are designed for receiving the connecting elements 60, 62. The connecting elements are embodied in the form of pins 62 and screws 60 (FIG. 9). By tightening the connecting elements 60 embodied as screws 60, the end faces of the spacing bodies 52 define the position of the two rotating bodies 50, 50'.

In contrast to the rotating body 50', which is not directly seated on the base body 40, the rotating body 50 is supported by seating means directly in relation to the base body 40, radially in a standard direction in respect to the rotating shaft 40a, as well as axially in the direction of the rotating shaft 40a in relation to the base body 40 and the holding body 40'. The seating means comprise direct rolling seating 42 of the rotating body 50 in the base body 40. Openings 47 for fastening means 95 are arranged on the end face 49 of the base body 40, by means of which the holding body 40' can be fastened on the base body 40.

In the gear represented in FIGS. 1, 1a, 1b, 1c, 5 and 9, the rolling seating 42 is comprised of cylinder-shaped rolling elements 43a, 43b, 43c, which roll off on the bearing surfaces 42a, 42b, 50c, 50d, 40'a, which are formed on the base body 40, the rotating body 50 and the holding body 40' and loop completely around the rotating shaft 40a.

The rolling elements 43a are arranged between the bearing surface 42a and the bearing surface 50c of the rotating body 50 facing the interior toothing 41. The bearing surface 42a constitutes a ring-shaped, step-shaped shoulder, which terminates perpendicularly in relation to the rotating shaft 40a approximately flush with the interior toothing 41. The bearing surface 50c, on which the rolling elements 43a roll off directly on the rotating body 50, is the outer ring of the face of the rotating body 50, which faces the interior toothing and extends in a standard way in relation to the rotating shaft 40a. In this case the axes 43a1 of the cylinder-shaped rolling elements 43 extend perpendicularly in relation to the rotating shaft 40a of the rotating body 50.

The rolling elements 43*b* are arranged between the bearing surface 40'*a* and the bearing surface 50*c* of the rotating body 50 facing away from the interior toothing 41. The bearing surface 40'*a* is the inner ring, facing the rotating body 50, of the flat surface of the holding body 40', which extends in a standard way in respect to the rotating shaft 40*a*. The bearing surface 50*c* on which the rolling elements 43*b* of the rolling body 50 roll off, is a ring-shaped surface, standard in respect to the rotating shaft 40*a* of a step-shaped shoulder on the side of the rotating body 50 facing away from the interior toothing. The axes 43*b*1 of the cylinder-shaped rolling elements 43*b* also extend perpendicularly in relation to the rotating shaft 40*a* of the rotating body 50.

The rolling elements 43*a* and 43*b* support the rotating body 50 directly on the base body 40 and on the holding body 40' in both axial directions.

The rolling elements 43*c* are arranged between the bearing surface 42*b* extending around the rotating shaft 40*b* and the bearing surface 50*d* of the rotating body 50, which is arranged on the side of the rotating body 50 facing away from the interior toothing and also extends around the rotating shaft 40*a*. The bearing surface 42*b* is an inner cylinder face, which extends in the axial direction parallel with the rotating shaft 40*a* on the inside of the base body 40 facing the rotating body 50. The bearing surface 50*d* is constituted by an outer cylinder shell surface, which is formed by a shoulder of the rotating body arranged on the side of the rotating body facing away from the interior toothing 41. The axes 43*c*1 of the cylinder-shaped rolling elements 43*c* extend parallel to the rotating shaft 40*a* of the rotating body 50. The rolling elements 43*c* support the rotating body 50 on the base body 40 in the radial direction.

The rolling elements 43*a* are arranged in a bearing cage 45. In principle, it is conceivable that all rolling elements 43*a*, 43*b*, 43*c* are arranged in bearing cages, which keep the rolling elements 43*a*, 43*b*, 43*c* spaced apart from each other so that no frictional losses can occur between them.

It is possible to employ customary, proven parts, which can be produced with high precision in mass production, namely cylinder-shaped rolling bodies, which do not require individual treatment, for the rolling elements 43*a*, 43*b*, 43*c*.

For weight reduction, the input member 10 has a continuous opening 4 extending coaxially with the rotating shaft 40*a*. As indicated in FIG. 5, this opening 4 can simultaneously be used for receiving, and/or connecting with a driveshaft of a drive motor 8.

In the gear represented in FIGS. 1, 1*a*, 1*b*, 1*c*, 5 and 9, the cylinder-shaped rolling elements 43*a* are arranged, displaced radially outward, in the area of the conversion element 70. A particularly space-saving construction is achieved by this, which has short and compact dimensions in the axial direction. Because the conversion element 70 [which does not perform a true rotating movement around the rotating shaft 40*a* but instead performs a combination of rotating movements around the rotating shaft 40*a* and standard linear movements in relation to the rotating shaft 40*a*] is located, radially inwardly displaced, at the level of the cylinder-shaped rolling elements 43*a*, the cylinder-shaped rolling elements 43*a* cannot be kept in their positions on the exterior circumference of the base body 40 by the conversion element 70. As a result, a ring-shaped support body 46 is provided for between the rotating body 50 and the toothed wheel 30, which keeps the cylinder-shaped rolling elements 43*a* in their positions. Furthermore, the cylinder-shaped rolling elements 43*a* are arranged in a bearing cage. A further characteristic feature of the gear represented in FIGS. 1, 1*a*, 1*b*, 1*c*, 5 and 9 is that the cylinder-shaped rolling elements 43*b* and 43*c* (which support the rotating body in the radial direction as well as in the opposite axial direction as the cylinder-shaped rolling elements 43*a*) are arranged in a common annular chamber defined by the bearing surfaces 40'*a*, 42*b*, 50*c* and 50*d*.

The gear represented in FIGS. 2 and 2*a* is a more rugged embodiment of the gear represented in FIGS. 1, 1*a*, 1*b*, 1*c*, 5 and 9. This is because in a first annular chamber defined by the bearing surfaces 40'*a*, 42*b*, 50*c* and 50*d*, and in a second annular chamber defined by the bearing surfaces 42*a*, 42*b*, 50*c* and 50*d*, there are cylinder-shaped rolling elements 43*r* for the direct radial support of the rotating body 50 on the base body 40, and cylinder-shaped rolling elements 43*a* for the direct axial support of the rotating body 50 on the base body 40. Here, the function of the rolling elements 43*r* corresponds to that of the rolling elements 43*c* in FIGS. 1, 1*a*, 1*b*, 1*c*, 5 and 9. In this case, the shafts of the cylinder-shaped rolling elements 43*a* extend perpendicularly in relation to the rotating shaft 40*a*, while the shafts of the cylinder-shaped rolling elements 43*r* extend parallel in relation to the rotating shaft 40*a*. Both annular chambers are defined by a common step-shaped shoulder, which is comprised of the bearing surfaces 42*a* and 42*b* and is spaced apart from the interior toothings 41 of the base body 40 by the width of the conversion element 70. Because of this, for the direct support of the rotating body 50 on the base body 40, and on the holding body 40' (against forces extending in the axial direction with respect to conversion element 70 arranged on the same side of the interior toothing 41 as the rotating body 50), the rolling elements 43*a* are arranged offset in the direction away from the rotating shaft 40*a* from the interior toothing 41. An advantage arising from this is that, because the rolling bodies constituting the seating means are arranged axially offset and displaced toward the exterior in respect to the parts arranged between the rotating bodies 50, 50', an increase of the interior space available for the movable parts between the rotating bodies 50, 50' results. Because of this, with the same exterior diameter, or respectively the same exterior dimensions, the gear can be more ruggedly designed, since a larger structural space in the radial direction is available to the conversion elements 70 in the base body 40.

With the gear represented in FIG. 3, ball-shaped rolling elements 43*g* are employed instead of cylinder-shaped rolling elements 43*a*, 43*b*, 43*c*, 43*r*, and are arranged in a correspondingly shaped annular space defined by the holding body 40', the base body 40, and the rotating body 50. Together with the correspondingly shaped annular space, the ball-shaped rolling elements 43*g* are capable of supporting the rotating body 50 in the axial, and radial direction directly on the base body 40, as well as on the holding body 40'. The annular space is defined by concavely arched bearing surfaces 40'*a*, 42*a*, 50*c*, 50*d*, which completely extend around the rotating shaft. In this case, the bearing surfaces 40'*a*, 42*a*, 50*c*, 50*d* are arranged inclined by approximately 45° with respect to the rotating shaft 40. In the present embodiment, the bearing surface 40'*a* is a concave surface of the holding body 40' and is oriented obliquely toward the rotating shaft 40*a* and toward the interior toothing 41. Accordingly, in the instant embodiment, the bearing surface 42*a* is a concave surface of the base body 40, which is oriented obliquely toward the rotating shaft 40*a* and away from the interior toothing 41. In the instant embodiment the bearing surface 50*c* is a concave surface of the rotating body 50 oriented obliquely away from the rotating shaft 40*a* and from the interior toothing 41. In the instant embodiment the bearing surface 50*d* is a concave surface of the rotating body 50 oriented obliquely away from the rotating shaft 40*a* and toward the base body 40. An advantage resulting from this design is that only a single annular space is required for transmitting all axial and radial forces acting on the rotating body 50 via common rolling elements 43*g* directly to the base body 40 and the holding body 40', which is connected by fastening means 95 with the base body 40.

In the gear represented in FIG. 4, cylinder-shaped rolling elements 43*d*, 43*e* are provided for the direct support of the rotating body 50 in the axial and radial direction with respect to the base body 40 and the holding body 40'. The rolling elements 43*d*, 43*e* are arranged in an annular space, which is inclined by 45° with respect to the rotating shaft 40*a*, has a square cross section, and extends around the rotating shaft 40*a*. In this case, the shafts 43*d*1 and 43*e*1 of the rolling elements 43*d* and 43*e* are inclined with respect to the rotating shaft 40*a* in opposite directions by respectively 45°. The annular space is defined by the holding body 40', the base body 40, and the rotating body 50. Bearing surfaces 40'*a*, 42*a*, 50*c*, 50*d*, which extend completely around the rotating shaft and constitute the annular space, are arranged on the holding body 40', the base body 40 and the rotating body 59. Accordingly, in the instant embodiment, the bearing surface 40'*a* is a level surface of the holding body 40', which is obliquely oriented with respect to the rotating shaft 40*a* by 45° toward the rotating shaft 40*a* and toward the interior toothing 41. Accordingly, in the instant embodiment the bearing surface 42*a* is a level surface of the base body 40 which, with regard to the rotating shaft 40*a*, is oriented obliquely by 45° toward the rotating shaft 40*a* and away from the interior toothing 41. Accordingly, in the instant embodiment the bearing surface 50*c* is a level surface of the rotating body 50 which, with regard to the rotating shaft 40*a*, is oriented obliquely by 45° away from the rotating shaft 45 and from the interior toothing 41. Accordingly, in the instant embodiment the bearing surface 50*d* is a level surface of the rotating body 50, which is oriented obliquely by 45°, with regard to the rotating shaft 40*a*, away from the rotating shaft 40*a* and toward the base body 40. An advantage resulting from this embodiment is that only a single annular space is required for transmitting all axial and radial forces acting on the rotating body 50 via rolling elements 43*d*, 43*e* directly to the base body 40 and the holding body 40', which is connected via the fastening means 95 with the base body 40. One advantage over the embodiment in accordance with FIG. 3 is that, in contrast to the ball-shaped rolling elements 43*g*, the cylinder-shaped rolling elements 43*d*, 43*e* can withstand higher loads because they do not rest pointedly, but in a line shape on the respectively assigned bearing surfaces.

A further embodiment of the gear is represented in FIGS. 5 and 9. On the driving side of the gear—on which in FIG. 5 the motor shaft of a drive motor 8, which is connected with the input member 10, is arranged—a cover 94 is provided, which protects the movable parts in the interior of the gear against dirt.

In this case the cover 94 has a shoulder formed by a step-shaped tapering on its exterior. This step-shaped tapering fits, in a positive manner, the interior diameter of the base body 40. On its exterior circumference, the cover 94 terminates flush with the exterior circumference of the base body 40. The cover 94 has a central opening, through which the input member 10 is guided. A circumferential seal 92 is arranged between the cover 94 and the input member 10 to prevent the penetration of dirt.

As represented in FIG. 9 a circumferential seal 93 may be provided in the same manner between the rotating body 50 and the holding body 40', which prevents the penetration of dirt into the gear on the power take-off side.

It is also possible, as represented in FIGS. 5 and 9, to form a bearing surface 91 for the seating bodies 3 in the central opening in the cover 94, by means of which the input member 10 is seated on the cover 94 connected with the base body 40, instead of on the non-seated [or respectively not directly seated on the base body 40] rotating body 50', as provided in FIGS. 1 to 4. In this way, no axial forces can act on the rotating body 50', which is not-seated [or respectively not directly seated on the base body 40], so that it is also assured that the connecting elements 60, 62, which connect the two rotating bodies 50, 50' to each other, need not transmit any external axial forces, or respectively those generated by external influences, between the rotating bodies 50, 50'.

It is common to all gears described in the exemplary embodiments that they have a step-shaped tapering of the base body 40 in the form of a step 44. This step 44 is used for fastening the gear on a frame 1. Because of the step 44, the fastening means 95 for fastening the holding body 40' on the base body 40 can simultaneously be used for fastening the gear on the frame 1. The step 44 is comprised of an exterior end face 44*a* and a circumferential shell surface 44*e*. An interior centering surface 44*i* for centering a cover 94 is provided on the interior of the base body 40 on the side of the gear facing the step 44.

In this case, the centering surface 44*i* can be embodied as represented in FIGS. 6 and 7. In FIG. 6, the interior centering surface 44*i* is embodied in the shape of a phase on the interior shell face of the base body 40. Because it is self-centering, the cover 94 can be placed on the base body 40 in a particularly simple manner. In FIG. 7, the centering surface 44*i* is embodied as a cylinder-shaped interior surface, which can be simultaneously used as a guide track for radial seating bodies 5, which guide the rear rotating body 50' in the radial direction with respect to the base body 40. In this regard, it is important that the radial seating bodies 5 be freely displaceable in the direction of the rotating shaft 40*a*, i.e., that they cannot absorb and transfer any axial forces. In this way, it can be assured that the connecting elements 60, 62 need not transmit any external axial forces, or those being created by external influences, between the rotating bodies 50, 50'.

It is important to stress that the gear in accordance with the invention can also be designed to have only a toothed wheel 30, a conversion element 70 and two rotating bodies 50, 50'. In this case, in order to compensate for the imbalance caused by the conversion element 70, a counterweight may be provided.

It is as important to stress that, in connection with the gear in accordance with the invention, the input member, the output member, or the base body can in principle be the drive side, the power take-off side, or the fixed element, without the principal function of the gear being hampered. Only the transmission ratio is changed by this. In the exemplary embodiments represented in FIGS. 1 to 9, the respective input member 10 is intended to be driven by a drive motor 8, wherein the drive side preferably is that side of the gear on which the rotating body 50' which is non-seated [or respectively not directly seated on the base body 40] is arranged. The power take-off side is comprised of the rotating body 50 which is directly seated in the base body 40. Experience has shown that the loads on the power take-off side are larger than on the drive side, so that it is advantageous to embody the power take-off side at the directly seated rotating body 50.

The essential characteristics and advantages of the proposed gear is that only the rotating body 50, which is directly seated on the base body 40, is practically exposed to all forces acting on the gear, or inside the gear, from the effects of exterior loads or forces. The rotating body 50', which is not-seated, or respectively not seated directly on the base body 40, is only exposed to inner static forces emanating from the connecting elements. The directly seated rotating body 50 regularly constitutes the working side of the gear under load. However, the forces and loads thereby created are not transmitted to the rotating body 50', which is not-seated, or respectively not seated directly on the base body 40. Therefore the connecting elements, which are preferably embodied in the form of screws, can be designed to be simpler. They need only keep the output member together. The function of the rotating body 50', which is not-seated, or respectively not seated directly on the base body 40, is reduced to complete the output member. The thickness of this rotating body 50', which is not-seated, or respectively not seated directly on the base body 40, and is regularly embodied as a circular disk, can therefore be reduced to a minimum with the result that the axial length of the gear can be reduced. The holding body 40', which works together with the rotating body directly seated on the base body 40 can, in the simplest design, be a pipe section, which only needs to be grounded on the end faces and provided with bores for screws. Thus, complicated and expensive work on the holding body is not required. The interior diameter of the holding body is matched to the exterior diameter of the base body 50, which is directly seated on the base body 40, as well as to that of the base body 40. A running space is defined between the base body 50, which is directly seated on the base body 40, the base body 40 and the holding body 40', in which rolling elements are arranged. If the rotating body 50 which is directly seated on the base body 40 is seated on its two end faces, it is possible to employ cylindrical seating elements, some of which are axially, and others radially, oriented. The second running space is located in the plane of the cross, which results in an advantageous axial shortening of the gear (approximately by the thickness of the cross), and therefore to a weight reduction. The direct seating in accordance with the invention of the rotating body 50 on the base body 40 has, as a result that the ratio between the exterior diameter of the cylindrical base body and its maximal interior diameter, clearly less weight than that in the prior art. It is thus possible to match the dimensions of the cross, of the toothed wheels, of the openings, as well as other parts of the planetary gear, to each other and to optimize them in such a way that the torsion capacity of the gear (with unchanged exterior diameter) can be increased by up to 80%, along with a clear reduction in the weight of the gear.

The invention can be employed in particular in the field of the production of planetary or cycloid gears, for example, for use in industrial robots, for electrical parking brakes of motor vehicles, or generally in applications requiring a lightweight gear with a high transmission ratio and high output data in a structural space which is as compact as possible.

What is claimed is:

1. A gear having a hollow, cylinder-like base body, which has an interior toothing, a rotating shaft, and end faces, and in which a driven input member and an output member are rotatably seated, wherein the output member is comprised of two rotating bodies fixedly connected together, which rotate only in unison, having a cross section which is circular transversely with respect to the rotating shaft, and between which are arranged at least one toothed wheel and means for converting planetary movements of the toothed wheel into eccentric movements of the output member, characterized in that the forces keeping the output member together are independent of the seating forces acting between the output member and the base body.

2. The gear in accordance with claim 1, characterized in that in order to obtain the independence of the forces holding the output member together from the seating forces acting between the output member and the base body, axial forces are supplied between the rotating bodies of the output member, which keep the output member together, while axial seating forces acting between the output member and the base body are supplied between only one of the two rotating bodies of the output member and the base body.

3. The gear in accordance with claim 2, characterized in that axial forces which keep the output member together are applied by means acting between the rotating bodies of the output member.

4. The gear in accordance with claim 2 or 3, characterized in that the axial seating forces which act between the output member and the base body are applied by means acting on only one of the two rotating bodies.

5. The gear in accordance with claim 1, characterized in that the output member is fastened on the base body by means of a holding body, which can be, or respectively is, connected to one end face.

6. The gear in accordance with claim 5, characterized in that the holding body is ring-shaped.

7. The gear in accordance with claim 5, characterized in that to fasten the output member on the base body, one of the rotating bodies is rotatably seated directly on or in the base body.

8. The gear in accordance with claim 5, characterized in that to fasten the output member on the base body, one of the rotating bodies is rotatably seated directly on or in the base body for support against at least axial forces, while the other rotating body is not seated on or in the base body, or is only indirectly rotatably seated on or in the base body, or is rotatably seated directly on or in the base body, for support against radial forces.

9. The gear in accordance with claim 8, characterized in that for support against axial forces, as a well as for support against radial forces, one of the rotating bodies is rotatably seated directly on or in the base body.

10. The gear in accordance with claim 8, characterized in that the rotating body, which is rotatably seated directly on or in the base body, is supported by seating means on the holding body, which can be, or respectively is, fixedly connected to the one end face.

11. The gear in accordance with claim 10, characterized in that the seating means are arranged in the area of that end face at which the holding body is arranged.

12. The gear in accordance with claim 10, characterized in that tracks for the rolling bodies, which constitute the seating means, are provided at least on the rotating body, which is directly seated on or in the base body, as well as in the base body.

13. The gear in accordance with claims 10 characterized in that at least the seating means used for supporting the rotating body, which are seated directly on or in the base body, against forces extending in the axial direction toward the interior toothing and are used for the conversion of planetary movements of the toothed wheel into rotating movements of the output member and which are arranged on the same side of the interior toothing as the rotating body which is seated directly on or in the base body, are arranged offset radially outwardly.

14. The gear in accordance with claims 10, characterized in that at least the seating means used for supporting the rotating body, which are seated directly on or in the base body, against forces extending in the axial direction, are arranged in the direction of the rotating shaft offset away from the interior toothing in relation to a means used for the conversion of planetary movements of the toothed wheel into rotating movements o the output member and which are arranged on the same side of the interior toothing as the rotating body which is seated directly on or in the base body offset away in the direction from the interior toothing.

15. The gear in accordance with 10, characterized in that the seating means are embodied as ball-shaped rolling elements, which support the rotating body, which is directly seated on or in the base body, in the axial, as well as the radial direction, and which are arranged in a common annular space defined by tracks formed on the holding body, the base body, as well as the rotating body, which is directly seated on or in the base body, in the area of the end face on which the holding body is arranged.

16. The gear in accordance with claim 10, characterized in that the seating means are embodied as cylinder-shaped rolling elements, which support the rotating body which is directly seated on or in the base body, in the axial, as well as the radial direction, and which are arranged in a common annular space defined by tracks, respectively inclined by 45° in relation to the rotating shaft, and formed on the rotating body, which is directly seated on or in the base body, the holding body, the base body, in the area of the end face on which the holding body is arranged.

17. The gear in accordance with claim 1, characterized in that the gear, on its side facing a rotating body, which is non-seated, or only indirectly seated on or in the base body, or directly seated on or in the base body only for support against radial forces, has a cover which protects the movable parts in the interior of the gear against dirt.

18. The gear in accordance with claim 17, characterized in that the cover has a central opening, through which the input member is introduced.

19. The gear in accordance with claim 17, characterized in that a circumferential seal is arranged between the cover and the input member in the area of the central opening.

20. The gear in accordance with claim 17, characterized in that a bearing surface for seating bodies is formed on the cover, on which the input member is seated on the cover with its side facing a base body, which is non-seated, or only indirectly seated on or in the base body, or directly seated on or in the base body, only for support against radial forces.

21. The gear in accordance with claims 1 characterized in that a circumferential seal is provided between the base body, seated directly on or in the base body and the holding body.

22. The gear in accordance claim 1, characterized in that the side of the gear facing the rotating body seated directly on or in the base body is embodied as the power take-off side, and the side of the gear facing a base body, which is non-seated, or only indirectly seated on or in the base body, or directly seated on or in the base body. only for support against radial forces, is embodied as the driving side of the gear.

23. The gear in accordance with claim 1, characterized in that the means for converting planetary movements of the toothed wheel into rotating movements of the output member comprise a conversion element in the shape of a cross.

24. The gear in accordance with claim 23, characterized in that the conversion element designed in the shape of a cross is arranged to be displaceable in relation to the toothed wheel and the rotating bodies and performs transverse movements in relation to the axis of the input member.

* * * * *